(12) United States Patent
Nanba et al.

(10) Patent No.: US 9,233,302 B2
(45) Date of Patent: Jan. 12, 2016

(54) GAME PROGRAM, GAME DEVICE AND GAME CONTROL METHOD

(75) Inventors: Kazuhiro Nanba, Hyogo (JP); Masatoshi Yamaoka, Osaka (JP); Hironobu Mori, Osaka (JP); Syuichi Myogan, Osaka (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 122 days.

(21) Appl. No.: 13/248,743

(22) Filed: Sep. 29, 2011

(65) Prior Publication Data

US 2012/0083337 A1 Apr. 5, 2012

Related U.S. Application Data

(63) Continuation of application No. PCT/JP2010/051763, filed on Feb. 8, 2010.

(30) Foreign Application Priority Data

Mar. 31, 2009 (JP) ................................. 2009-085434

(51) Int. Cl.
| | | |
|---|---|---|
| *A63F 13/00* | (2014.01) | |
| *A63F 13/214* | (2014.01) | |
| *A63F 13/2145* | (2014.01) | |
| *A63F 13/40* | (2014.01) | |

(52) U.S. Cl.
CPC .......... *A63F 13/10* (2013.01); *A63F 2300/1075* (2013.01); *A63F 2300/303* (2013.01); *A63F 2300/406* (2013.01); *A63F 2300/6045* (2013.01); *A63F 2300/8011* (2013.01)

(58) Field of Classification Search
CPC ................ A63F 2300/1075; A63F 2300/8011; A63F 2300/303; A63F 2300/406; A63F 2300/6045

USPC .......................................... 463/1–6, 7, 30–33
See application file for complete search history.

(56) References Cited

U.S. PATENT DOCUMENTS

| | | |
|---|---|---|
| 2006/0128468 A1 | 6/2006 | Yoshikawa et al. |
| 2008/0143687 A1 | 6/2008 | Nakasaka |
| 2009/0163275 A1* | 6/2009 | Ishii et al. ....................... 463/31 |

FOREIGN PATENT DOCUMENTS

| | | |
|---|---|---|
| JP | 2006-129942 A | 5/2006 |
| JP | 2006-192246 A | 7/2006 |

(Continued)

OTHER PUBLICATIONS

Hart, Arend, "MLB 06 The Show" review, http://www.sinjinsolves.com/reviews/ps2/mlb06/theshow.htm. Apr. 11, 2006.*
Triple Play Baseball Review Mar. 31, 2001.*
Little League World Series Baseball 2008 Review, Dec. 11, 2008.*

(Continued)

*Primary Examiner* — Ronald Laneau
*Assistant Examiner* — Ross Williams
(74) *Attorney, Agent, or Firm* — Global IP Counselors, LLP

(57) ABSTRACT

It is an object of the present invention to allow a game player to quickly and easily give a command to a game character. In the present program, an object moving on a first path is displayed on an image display unit. When an instruction section is then slid in contact with the image display unit, the slide distance of the instruction section is calculated. An action pattern of a character with respect to an object is then set in accordance with the slide distance. A determination region is set in accordance with the action pattern. A positional relation between the object and the determination region is then determined, and the object moving on a second path is displayed on the image display unit.

10 Claims, 20 Drawing Sheets

| SLIDE DISTANCE DATA LS | SWING PATTERN | SK |
|---|---|---|
| 0 ≤ LS ≤ X1 | COMPACT SWING | 1 |
| X1 < LS ≤ X2 | NORMAL SWING | 2 |
| X2 < LS | FULL SWING | 3 |

(56) References Cited

FOREIGN PATENT DOCUMENTS

| | | |
|---|---|---|
| JP | 2008-152362 A | 7/2008 |
| TW | 200833402 A | 8/2008 |

OTHER PUBLICATIONS

International Search Report of corresponding International Application No. PCT/JP2010/051763, dated Mar. 23, 2010.

* cited by examiner

| PITCH | PITCH DATA K | DISPLAY REGION |
|---|---|---|
| STRAIGHT FASTBALL | 1 | RS1 |
| SPLIT FINGER FASTBALL | 2 | RS2 |
| CURVEBALL | 3 | RS3 |
| SCREW BALL | 4 | RS4 |

| SEGMENTED REGION | IDENTIFICATION DATA I |
|---|---|
| FIRST | 1 |
| SECOND | 2 |
| THIRD | 3 |
| FOURTH | 4 |
| FIFTH | 5 |

| MOVING TENDENCY | TENDENCY DATA K(I) |
|---|---|
| GROUNDER | 1 |
| LINE DRIVE | 2 |
| HOME RUN | 3 |
| FLY | 4 |
| FOUL TIP | 5 |

FIG. 16
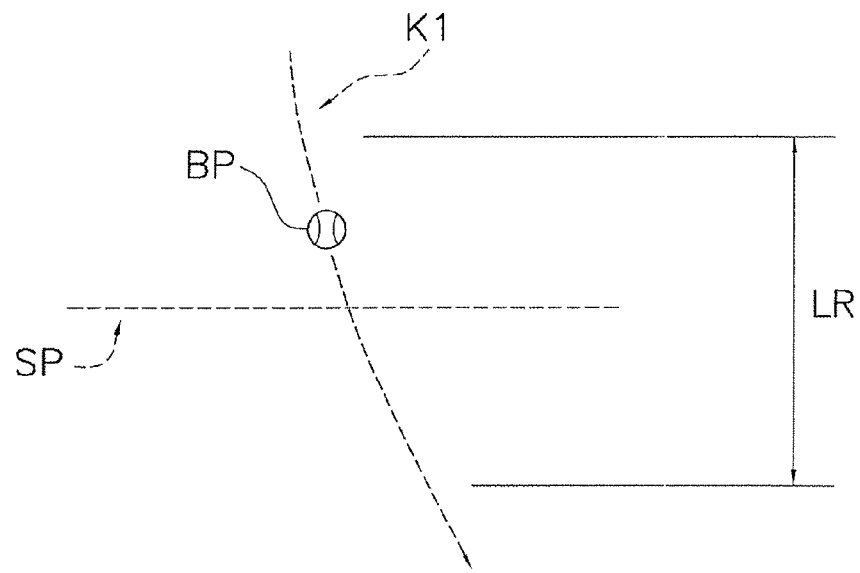
FIG. 17
| SLIDE DISTANCE DATA LS | SWING PATTERN | SK |
|---|---|---|
| 0 ≤ LS ≤ X1 | COMPACT SWING | 1 |
| X1 < LS ≤ X2 | NORMAL SWING | 2 |
| X2 < LS | FULL SWING | 3 |
FIG. 18
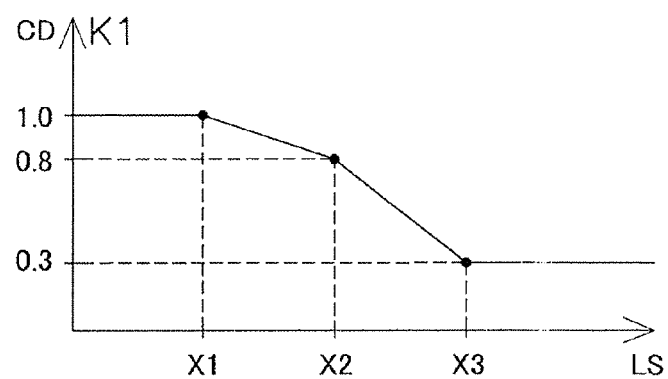

(a) CONTACT HITTING STATE (b) NON-CONTACT HITTING STATE (a)

(b)

GAME PROGRAM, GAME DEVICE AND GAME CONTROL METHOD

CROSS-REFERENCE TO RELATED APPLICATIONS

This is a continuation application of PCT Patent Application No. PCT/JP2010/051763 filed Feb. 8, 2010 which claims priority to Japanese Patent Application No. 2009-085434 filed on Mar. 31, 2009. The entire disclosure of PCT Patent Application No. PCT/JP2010/051763, and Japanese Patent Application No. 2009-085434 is hereby incorporated herein by reference.

TECHNICAL FIELD

The present invention relates to a game program, particularly to a game program that is allowed to execute a game in response to contact of an instruction section onto a contact input type image display unit. Further, the present invention relates to a game device that is allowed to execute the game program and a game control method that is controlled by a computer based on the game program.

BACKGROUND ART

There have been heretofore suggested a variety of video games. Such video games are configured to be executed by the game devices. For example, the game devices normally include a monitor, a game console provided separately from the monitor, and an input device such as a control pad provided separately from the game console. A plurality of input buttons is disposed on the control pad.

For example, the baseball video games have been known as a type of video games feasible in such game devices (see Non-patent Literature 1). In the baseball video games, a control unit is configured to issue a command to a baseball player character in response to a game player's operation of the control pad. Accordingly, the monitor displays a scene that the baseball player character as an operating target performs an action corresponding to the command.

Software for PlayStation® "Jikkyo Powerful Pro Yakyu 15" released on Jul. 24, 2008 by Konami Digital Entertainment Co., Ltd. (Non Patent Literature 1) is an example of the related art.

SUMMARY

Technical Problem

In the well-known baseball video games, a variety of commands have been configured to be given to a baseball player character as an operating target in response to an operation of the plural input buttons disposed on the control pad.

When a baseball player character as an operating target is a pitcher character, for instance, one of the pitches is configured to be selected when a game player operates one of direction instruction buttons (e.g., a portion of a cross shaped button) to which the pitches are uniquely allocated. The pitcher character is then configured to start performing a pitching motion when the game player operates a pitching start button for instructing the pitcher character to start performing a pitching motion. Further, a pitching course is configured to be moved to a desired position when the game player continuously operates the cross shaped button. The pitcher character is then configured to release a ball when a predetermined period of time elapses. The monitor is then configured to display a predicted passage position (destination point) for predicting a ball passage position on a hitting plane.

When a baseball player character as an operating target is a batter character, a game player is allowed to move a contact-hitting cursor towards the predicted passage position (destination point) of the ball by continuously operating the direction instruction buttons (e.g., the cross shaped button). The game player is then allowed to determine the position of the contact-hitting cursor by operating a determination button for determining the position of the contact-hitting cursor. Accordingly, the batter character is configured to start performing a swing motion. It is then determined whether or not the batter character can hit the ball with the bat based on the timing when the determination button is pressed and the position of the contact-hitting cursor at the timing when the determination button is pressed. When it is determined that the batter character can hit the ball with the bat, the ball hit back with the bat is configured to be displayed on the monitor.

In the well-known baseball video games, as described above, a variety of commands have been allowed to be given to the pitcher character and the batter character in response to an operation of buttons disposed on the control pad. Especially when the pitching course and the position of the contact-hitting cursor are determined in the well-known baseball video games, game players have been required to minutely adjust the pitching course and the position of the contract-hitting cursor by continuously pressing the cross shaped button. However, game players have been required to adjust them in a short period of time while the pitcher character starts performing a pitching motion and releases the ball or in a short period of time while the pitcher character releases the ball and the released ball arrives at the destination point. Therefore, this has resulted in drawbacks that game players erroneously operated the cross shaped button and that game players could not move the contact-hitting cursor to a desired position. Simply put, it has been difficult for game players to minutely adjust the pitching course and the position of the contact-hitting cursor in a short period of time in the aforementioned operating system using buttons. Such minute adjustment is quite difficult especially for novices. Therefore, a drawback has been pointed out that players without much experience could not fully enjoy playing the baseball video games until getting used to them.

The present invention is produced in view of the aforementioned drawbacks. It is an object of the present invention to allow a game player to quickly and easily give a command to a game character.

Solution to Problem

A game program according to a first aspect of the present invention is a program configured to cause a computer, which is allowed to execute a game in response to contact of an instruction section onto a contact input type image display unit, to realize the following functions.

(1) A first path calculating function of causing a control unit to execute a processing of calculating a first path of an object moving in a game space.

(2) A first object position recognizing function of causing the control unit to recognize first coordinate data indicating a position of the object moving on the first path.

(3) A first object displaying function of displaying the object moving on the first path on the image display unit based on the first coordinate data.

(4) A character displaying function of displaying on the image display unit a character configured to take an action with respect to the object in response to contact of the instruction section onto the image display unit.

(5) An instruction position recognizing function of causing the control unit to recognize second coordinate data indicating a position of the instruction section contacted onto the image display unit when the instruction section is contacted onto the image display unit.

(6) A slide distance calculating function of causing the control unit to execute a processing of calculating a slide distance of the instruction section based on the position indicated by the second coordinate data when the instruction section is slid in contact with the image display unit.

(7) An action pattern setting function of causing the control unit to execute a processing of setting an action pattern (swing motion) of the character (batter) with respect to the object (ball) in accordance with the slide distance.

(8) A determination region setting function of causing the control unit to execute a processing of setting a determination region (radius) based on the second coordinate data in accordance with the action pattern.

(9) A positional relation determining function of causing the control unit to execute a processing of determining a positional relation between the object and the determination region.

(10) A second path calculating function of causing the control unit to execute a processing of calculating a second path of the object when it is determined that the object and the determination region are overlapped.

(11) A second object position recognizing function of causing the control unit to recognize third coordinate data indicating a position of the object moving on the second path.

(12) A second object displaying function of displaying the object moving on the second path on the image display unit based on the third coordinate data.

According to the game program, the control unit is caused to execute a processing of calculating a first path of an object moving in the game space in the first path calculating function. In the first object position recognizing function, the control unit recognizes the first coordinate data indicating a position of the object moving on the first path. In the first object displaying function, the object, which is moving on the first path, is displayed on the image display unit based on the first coordinate data. In the character displaying function, a character, which is configured to take an action with respect to the object, is displayed on the image display unit in response to contact of the instruction section onto the image display unit. In the instruction position recognizing function, the control unit recognizes the second coordinate data indicating a position of the instruction section contacted onto the image display unit when the instruction section is contacted onto the image display unit. In the slide distance calculating function, the control unit executes a processing of calculating a slide distance of the instruction section based on the position indicated by the second coordinate data when the instruction section is slid in contact with the image display unit. In the action pattern setting function, the control unit is caused to execute a processing of setting an action pattern of the character with respect to the object in accordance with the slide distance. In the determination region setting function, the control unit is caused to execute a processing of setting a determination region based on the second coordinate data in accordance with the action pattern. The determination region herein corresponds to a region (range) where the character affects the object when the character takes an action. In the positional relation determining function, the control unit is caused to execute a processing of determining a positional relation between the object and the determination region. In the second path calculating function, the control unit executes a processing of calculating a second path of the object when it is determined that the object and the determination region are overlapped. In the second object position recognizing function, the control unit recognizes the third coordinate data indicating a position of the object moving on the second path. In the second object displaying function, the object, moving on the second path, is displayed on the image display unit based on the third coordinate data.

The first aspect of the present invention will be explained with an exemplary case in which the game program is applied to a video game of ball sports such as a baseball video game. The control unit executes a processing of calculating the path of the ball to be released from the pitcher character (i.e., a first path). The control unit then recognizes the first coordinate data indicating the position of the ball moving on the first path. The ball moving on the first path is then displayed on the image display unit based on the first coordinate data. The batter character, which is configured to perform a swing motion in response to contact of the instruction section onto the image display unit, is then displayed on the image display unit. The control unit then recognizes the second coordinate data indicating the position of the instruction section contacted onto the image display unit when the instruction section is contacted onto the image display unit. The control unit then executes a processing of calculating the slide distance of the instruction section based on the position indicated by the second coordinate data when the instruction section is slid in contact with the image display unit. The control unit then executes a processing of setting a pattern of the swing motion of the game character (i.e., a swing pattern) with respect to the ball in accordance with the slide distance. The control unit then executes a processing of setting a determination region based on the second coordinate data in accordance with the swing pattern. The control unit then executes a processing of determining a positional relation between the ball and the determination region. When it is then determined that the ball and the determination region are overlapped, the ball is hit back. In this case, the control unit executes a processing of calculating a second path of the flying ball. The control unit then recognizes the third coordinate data indicating the position of the ball moving on the second path. The ball moving on the second path is then displayed on the image display unit based on the third coordinate data.

In this case, a swing pattern is set in accordance with the slide distance when the instruction section such as a finger and a stylus pen is slid in contact with the image display unit. For example, "a compact swing", "a normal swing", and "a full swing" are used as exemplary swing patterns. Any one of the swing patterns is set in accordance with the slide distance. The determination region, corresponding to the swing pattern herein set, is then set based on the position of the finger or the stylus pen. The positional relation between the ball and the determination region is then determined. The second path of the ball is then calculated when it is determined that the ball and the determination region are overlapped as a result of the determination.

In an example corresponding to the aforementioned swing patterns, setting of the determination region herein indicates that the determination region is enlarged when the compact swing (i.e., a short swing) is performed whereas the determination region is reduced when the full swing (i.e., a long swing or an overswing) is performed. The determination region is thus set for making the baseball video game more realistic by reflecting a sense of batting of a real world baseball in the baseball video game. Specifically in a real world baseball, the overswing makes it difficult to hit the ball with the bat although it may result in a long flying distance of the ball if the ball is actually hit with the bat. On the other hand, the ball can be easily hit with the bat in the short swing than in the overswing, although the hit ball does not reach the outfield by the short swing. Such tendencies are realized by the aforementioned technical configuration. It should be noted that the positional relation between the ball and the determination region set as described above is determined and the moving path of the ball (i.e., the second path of the ball) is calculated when it is determined that the ball and the determination region are overlapped as a result of the determination.

According to the first aspect of the present invention, a game player can thus hit back the ball only by contacting his/her finger or the stylus pen onto the image display unit. Therefore, the game player is allowed to quickly and easily instruct a contact-hitting position even in a short period of time while the pitcher character releases the ball and the released ball reaches a destination point. Further, the game program is configured to reflect a sense of batting of the real world (e.g., a sense that the overswing makes it difficult to hit the ball with the bat) in the video game. Therefore, it is possible to realize a video game that is more realistic and allows a game player to emotionally get involved therewith. In addition, the swing patterns such as the compact swing and the overswing can be set by a simple movement, i.e., only by sliding a finger, a stylus pen or the like on the image display unit. A game player can intuitively give a command to the batter character as well as experience a good operation performance.

A game program according to a second aspect of the present invention relates to the game program according to the first aspect of the present invention. In the game program, the control unit executes a processing of setting an initial speed of the object corresponding to the action pattern and a processing of calculating the second path of the object based on the initial speed of the object. This function is realized in the second path calculating function.

The second aspect of the present invention will be explained with an exemplary case in which the game program is applied to a video game of ball sports such as a baseball video game. The initial speed of the ball is herein set in accordance with the swing patterns. For example, the initial speed of the ball is set for increasing the speed of the ball depending on the swing patterns in the order of "the compact swing", "the normal swing", and "the full swing". The second path of the hit-back ball is then calculated using the initial speed of the ball.

In the present invention, the initial speed of the ball is thus set in accordance with the swing patterns such as the full swing, the normal swing, and the compact swing. Therefore, the second path of the hit-back ball can be calculated in accordance with the swing patterns. Specifically regarding the aforementioned swing patterns, the flying distance of the ball by the full swing can be set to be the longest distance. Further, the flying distance of the ball by the normal swing can be set to be shorter than that by the full swing, and the flying distance of the ball by the compact swing can be set to be shorter than that by the normal swing. Thus, a variety of moving states of the hit-back ball can be displayed on the image display unit. For example, a sense of batting in the real word. For example, the sense that the flying distance of the ball is increased in proportion to enlargement of a swing motion, can be reflected in the video game. Therefore, it is possible to achieve an advantageous effect of realizing a more realistic game in addition to the advantageous effect of the first aspect of the present invention.

A game program according to a third aspect of the present invention relates to the game program according to the second aspect of the present invention. In the game program, an aspect of setting the initial speed of the object is specifically set for increasing the initial speed of the object in proportion to enlargement of an action expressed by the action pattern.

The third aspect of the present invention will be explained with an exemplary case in which the game program is applied to a video game of ball sports such as a baseball video game. The initial speed of the ball is herein set for increasing the speed of the ball in proportion to enlargement of a swing motion defined by the swing pattern.

According to the third aspect of the present invention, the initial speed of the ball is thus increased in proportion to enlargement of a swing motion. Therefore, the ball hit back with the bat easily flies away. Accordingly, the flying distance of the hit-back ball or the like can be changed depending on magnitude of a swing motion. In other words, a situation that a batter hits back the ball in the real world can be similarly duplicated in the game space. Putting the aforementioned contents together, the third aspect of the present invention has an advantageous effect of duplicating an event or a situation that may occur in the real world similarly in the game space as well as an advantageous effect of allowing a game player to quickly and easily give a command to a game character.

A game program according to a fourth aspect of the present invention relates to the game program according to one of the first to third aspects of the present invention. In the game program, an aspect of setting the determination region to be reduced in proportion to enlargement of an action expressed by the action pattern is specifically set.

According to the fourth aspect of the present invention, the determination region is reduced in proportion to enlargement of a swing motion. Therefore, the ball and the determination region are not easily overlapped. In other words, it becomes more difficult to hit the ball with the bat in proportion to enlargement of a swing motion. Accordingly, level of difficulty of hitting the ball with the bat can be changed in accordance with magnitude of a swing motion. Consequently, a situation that a batter hits the ball with the bat in the real world can be similarly duplicated in the game space and this realizes a more realistic video game.

A game program according to a fifth aspect of the present invention relates to the game program according to one of the first to fourth aspects of the present invention. The game program causes the computer to further realize the following function.

(13) A determination region adjusting function of causing the control unit to execute a processing of adjusting the determination region set in the determination region setting function in accordance with the slide distance.

According to the game program, the control unit executes a processing of adjusting the set determination region in accordance with the slide distance in the determination region adjusting function. Further in the positional relation determining function, the control unit executes a processing of determining a positional relation between the object and the determination region of an adjusted state.

When the game program is applied to a video game of ball sports such as a baseball video game, the already set determination region is further minutely adjusted in accordance with the slide distance of a finger or the like moved by a game player in contact with the image display unit. Further, the positional relation between the ball and the adjusted determination region is then determined.

According to the fifth aspect of the present invention, the determination region set in accordance with the swing pattern is thus further adjusted in accordance with the slide distance. Therefore, the game is rendered for minutely dealing with an operation of a game player and this makes the game more realistic.

A game program according to a sixth aspect of the present invention relates to the game program according to the fifth aspect of the present invention. In the game program, the determination region is adjusted to be a fixed size when the slide distance is greater than a predetermined value. This function is realized in the determination region adjusting function.

The sixth aspect of the present invention will be explained with an exemplary case in which the game program is applied to a video game of ball sports such as a baseball video game. For example, when the slide distance is herein greater than a predetermined value, the determination region is adjusted to be a predetermined size.

According to the sixth aspect of the present invention thus configured, the size of the determination region is fixed to be a predetermined size when the slide distance is greater than a predetermined value (i.e., an upper limit). With the configuration, for instance, the determination region can be reduced in accordance with the slide distance until the slide distance reaches the upper limit, whereas the determination region can be fixed to a predetermined size when the slide distance exceeds the upper limit. Even if a game player herein extremely widely slides the instruction section for hitting the ball far away, the determination region is fixed to a predetermined size (i.e., the determination region is not reduced to an extremely small point such as a pinpoint) when the slide distance exceeds the upper limit. Therefore, it is possible to avoid a drawback that the ball cannot be hit with the bat. Putting the aforementioned contents together, the sixth aspect of the present invention can resolve a drawback to be produced in duplicating an event or a situation that may occur in the real world in a video game.

A game program according to a seventh aspect of the present invention relates to the game program according to one of the first to sixth aspects of the present invention. The game program causes the computer to further realize the following function.

(14) A slide speed calculating function of causing the control unit to execute a processing of calculating a slide speed of the instruction section when the instruction section is slid in contact with the image display unit.

According to the game program, the control unit is caused to execute a processing of calculating a slide speed of the instruction section when the instruction section is slid in contact with the image display unit in the slide speed calculating function. In the second path calculating section, the control unit executes a processing of calculating the second path of the object based on the action pattern and the slide speed.

The seventh aspect of the present invention will be explained with an exemplary case in which the game program is applied to a video game of ball sports such as a baseball video game. The slide speed of the instruction section such as a finger or a stylus pen is herein calculated when the instruction section is slid in contact with the image display unit. For example, in the baseball video game, the slide speed corresponds to the swing speed. The second path of the hit-back ball is then calculated based on the swing pattern and the slide speed.

According to the seventh aspect of the present invention, the swing pattern can be thus set in accordance with the slide distance, while the swing speed can be set in accordance with the slide speed. Only by sliding a finger or a stylus pen, it is possible to set, for instance, the full swing at a high swing speed, the full swing at a low swing speed, the normal swing at a high swing speed, the normal swing at a low swing speed, the compact swing at a high swing speed and the compact swing at a low swing speed. Thus, a variety of swing motions performed by a batter in the real world can be similarly duplicated in the game space only by executing an operation of sliding a finger or a stylus pen. Putting the aforementioned contents together, the seventh aspect of the present invention can achieve an advantageous effect of duplicating an action of a sports player in the real world similarly in the game space as well as an advantageous effect of allowing a game player to quickly and easily give a command to a game character.

A game program according to an eighth aspect of the present invention relates to the game program according to the seventh aspect of the present invention. In the game program, the control unit executes a processing of setting the initial speed of the object corresponding to the action pattern, a processing of correcting the initial speed of the object based on the slide speed and a processing of calculating the second path of the object based on the initial speed of the object of a corrected state. This function is realized in the second path calculating function.

The eighth aspect of the present invention will be explained with an exemplary case in which the game program is applied to a video game of ball sports such as a baseball video game. The initial speed of the ball is herein set in accordance with the swing patterns, and the initial speed of the ball is corrected based on the swing speed. For example, when the initial speed of the ball corresponding to the swing pattern is a reference initial speed, the reference initial speed is corrected based on the swing speed. The second path of the hit-back ball is then calculated using the corrected initial speed of the ball.

According to the eighth aspect of the present invention, the reference initial speed of the ball is thus set based on the swing pattern, and the initial speed of the hit-back ball is corrected based on the swing speed. For example, regarding the full swing at a high swing speed, the reference initial speed for the full swing is corrected to be increased. Regarding the full swing at a low swing speed, in contrast, the reference initial speed for the full swing is corrected to be reduced. Likewise, the reference initial speed for the normal swing and that for the compact swing are corrected. Accordingly, it is possible in the game space to duplicate a variety of swing motions performed by a batter in the real world in a state similarly performed with respect to an event in the real world. Putting the aforementioned contents together, the eighth aspect of the present invention can achieve an advantageous effect of more realistically duplicating an action of a sports player of the real world in the game space as well as an advantageous effect of allowing a game player to quickly and easily give a command to a game character.

A game program according to a ninth aspect of the present invention relates to the game program according to one of the first to eighth aspects of the present invention. The game program causes the computer to further execute the following function.

(15) A time recognizing function of causing the control unit to recognize time data indicting a point of time when a predetermined period of time elapses after the instruction section is contacted onto the image display unit.

According to the game program, the control unit recognizes the time data indicating a point of time when a predetermined period of time elapses after the instruction section is contacted onto the image display unit in the time recognizing function. Further in the positional relation determining function, the control unit executes a processing of determining a positional relation between the object and the determination region at the point of time indicated by the time data.

The ninth aspect of the present invention will be explained with an exemplary case in which the game program is applied to a video game of ball sports such as a baseball video game. The control unit herein recognizes the time data indicating a point of time when a predetermined period of time elapses after a finger or a stylus pen is contacted onto the image display unit. The control unit then executes a processing of determining a positional relation between the determination region and the ball at the point of time indicated by the time data. It is determined whether or not the ball is hit with the bat when a predetermined period of time elapses, for instance, in such a case in which a point of time when a finger or a stylus pen is contacted on the image display unit is set as the timing when the batter character starts performing a swing motion.

According to the ninth aspect of the present invention, the timing when a finger or a stylus pen is contacted onto the image display unit thus corresponds to a swing starting command to be given to the batter character. In other words, the timing when it is determined whether or not the ball is hit with the bat (i.e., the contact hitting timing) is a point of time when a predetermined period of time elapses after a finger or a stylus pen is contacted onto the image display unit. Therefore, a game player is required to predict the contact hitting timing and give a swing starting command to the batter character. Thus, the video game provides a game player with fun of acquiring the timing of hitting back the ball and makes the game player devote himself/herself to the video game. Putting the aforementioned contents together, the ninth aspect of the present invention can produce a game not getting the game player bored by incorporating the aspect of technical intervention into the game.

A game device according to a tenth aspect of the present invention is a game device that is allowed to execute a game in response to contact of an instruction section onto a contact input type image display unit. The game device includes a first path calculating section, a first object position recognizing section, a first object displaying section, a character displaying section, an instruction position recognizing section, a slide distance calculating section, an action pattern setting section, a determination region setting section, a positional relation determining section, a second path calculating section, a second object position recognizing section, and a second object displaying section. The first path calculating section is configured to cause a control unit to execute a processing of calculating a first path of an object moving in a game space. The first object position recognizing section is configured to cause the control unit to recognize first coordinate data indicating a position of the object moving on the first path. The first object displaying section is configured to display the object moving on the first path on the image display unit based on the first coordinate data. The character displaying section is configured to display on the image display unit a character configured to take an action with respect to the object in response to contact of the instruction section onto the image display unit. The instruction position recognizing section is configured to cause the control unit to recognize second coordinate data indicating a position of the instruction section contacted onto the image display unit when the instruction section is contacted onto the image display unit. The slide distance calculating section is configured to cause the control unit to execute a processing of calculating a slide distance of the instruction section based on the position indicated by the second coordinate data when the instruction section is slid in contact with the image display unit. The action pattern setting section is configured to cause the control unit to execute a processing of setting an action pattern of the character with respect to the object in accordance with the slide distance. The determination region setting section is configured to cause the control unit to execute a processing of setting a determination region based on the second coordinate data in accordance with the action pattern. The positional relation determining section is configured to cause the control unit to execute a processing of determining a positional relation between the object and the determination region. The second path calculating section is configured to cause the control unit to execute a processing of calculating a second path of the object when it is determined that the object and the determination region are overlapped. The second object position recognizing section is configured to cause the control unit to recognize third coordinate data indicating a position of the object moving on the second path. The second object displaying section is configured to display the object moving on the second path on the image display unit based on the third coordinate data.

A game control method according to an eleventh aspect of the present invention is a game control method to be controlled by a computer that is allowed to execute a game in response to contact of an instruction section onto a contact input type image display unit. The game control method includes a first path calculating step, a first object position recognizing step, a first object displaying step, a character displaying step, an instruction position recognizing step, a slide distance calculating step, an action pattern setting step, a determination region setting step, a positional relation determining step, a second path calculating step, a second object position recognizing step and a second object displaying step. In the first path calculating step, a control unit executes a processing of calculating a first path of an object moving in a game space. In the first object position recognizing step, the control unit recognizes first coordinate data indicating a position of the object moving on the first path. In the first object displaying step, the object moving on the first path is displayed on the image display unit based on the first coordinate data. In the character displaying step, a character, which is configured to taken an action with respect to the object in response to contact of the instruction section onto the image display unit, is displayed on the image display unit. In the instruction position recognizing step, the control unit recognizes second coordinate data indicating a position of the instruction section contacted onto the image display unit when the instruction section is contacted onto the image display unit. In the slide distance calculating step, the control unit executes a processing of calculating a slide distance of the instruction section based on the position indicated by the second coordinate data when the instruction section is slid in contact with the image display unit. In the action pattern setting step, the control unit executes a processing of setting an action pattern of the character with respect to the object in accordance with the slide distance. In the determination region setting step, the control unit executes a processing of setting a determination region based on the second coordinate data in accordance with the action pattern. In the positional relation determining step, the control unit executes a processing of determining a positional relation between the object and the determination region. In the second path calculating step, the control unit executes a processing of calculating a second path of the object when it is determined that the object and the determination region are overlapped. In the second object position recognizing step, the control unit recognizes third coordinate data indicating a position of the object moving on the second path. In the second object displaying step, the object moving on the second path is displayed on the image display unit based on the third coordinate data.

Advantageous Effects of Invention

According to the present invention, a game player can quickly and easily give a command to a game character. Further, according to the present invention, a game player can intuitively and accurately give a command to a game character.

BRIEF DESCRIPTION OF THE DRAWINGS

FIG. 10 is a table representing correspondence between moving tendencies and tendency data.

FIG. 16 is a diagram for explaining determination of whether or a bat hits a ball in terms of time.

FIG. 17 is a table representing correspondence between slide distance data and swing patterns.

FIG. 18 is a chart representing correspondence between the slide distance data and adjustment data for adjusting a determination region.

DETAILED DESCRIPTION OF EXEMPLARY EMBODIMENTS

Game Device Configuration

Figure 1:
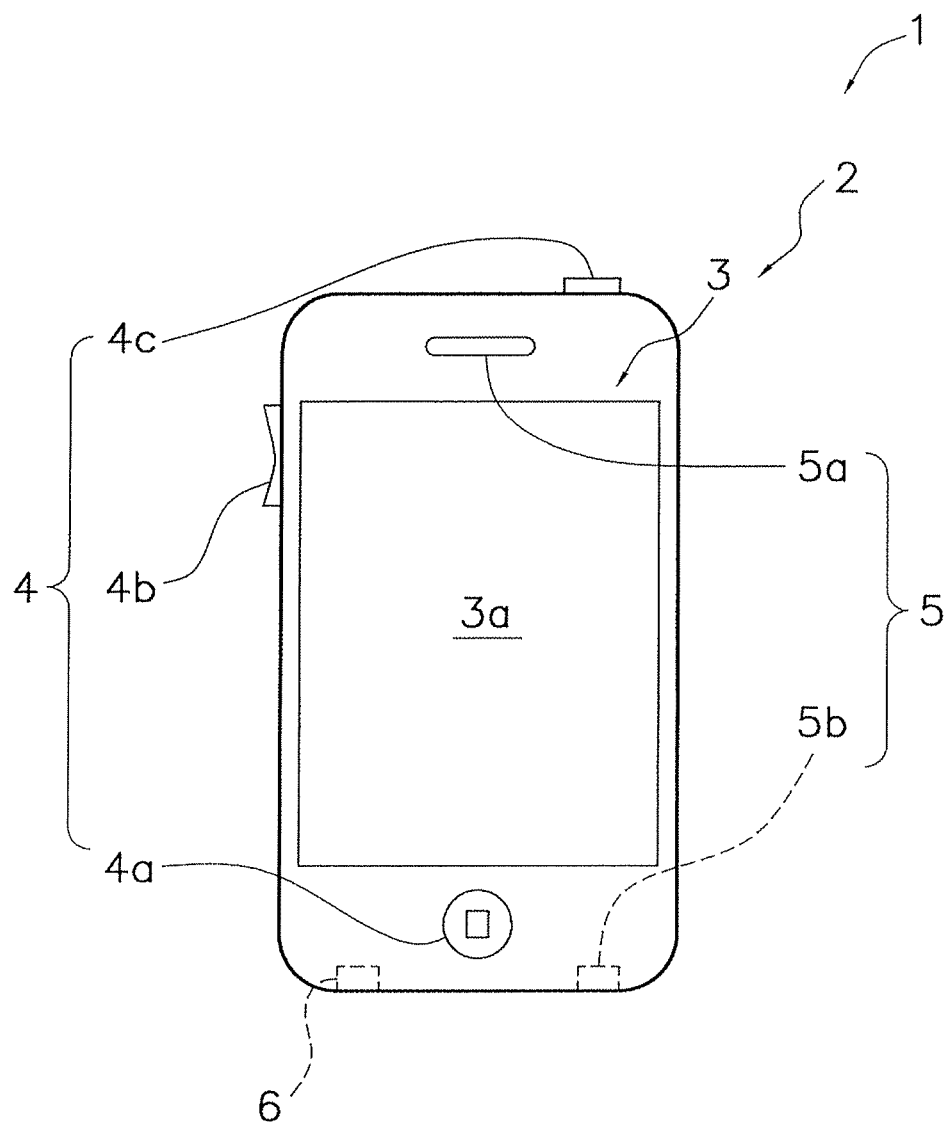
FIG. 1 is a diagram illustrating a portable game console according to an exemplary embodiment of the present invention.
Figure 2:
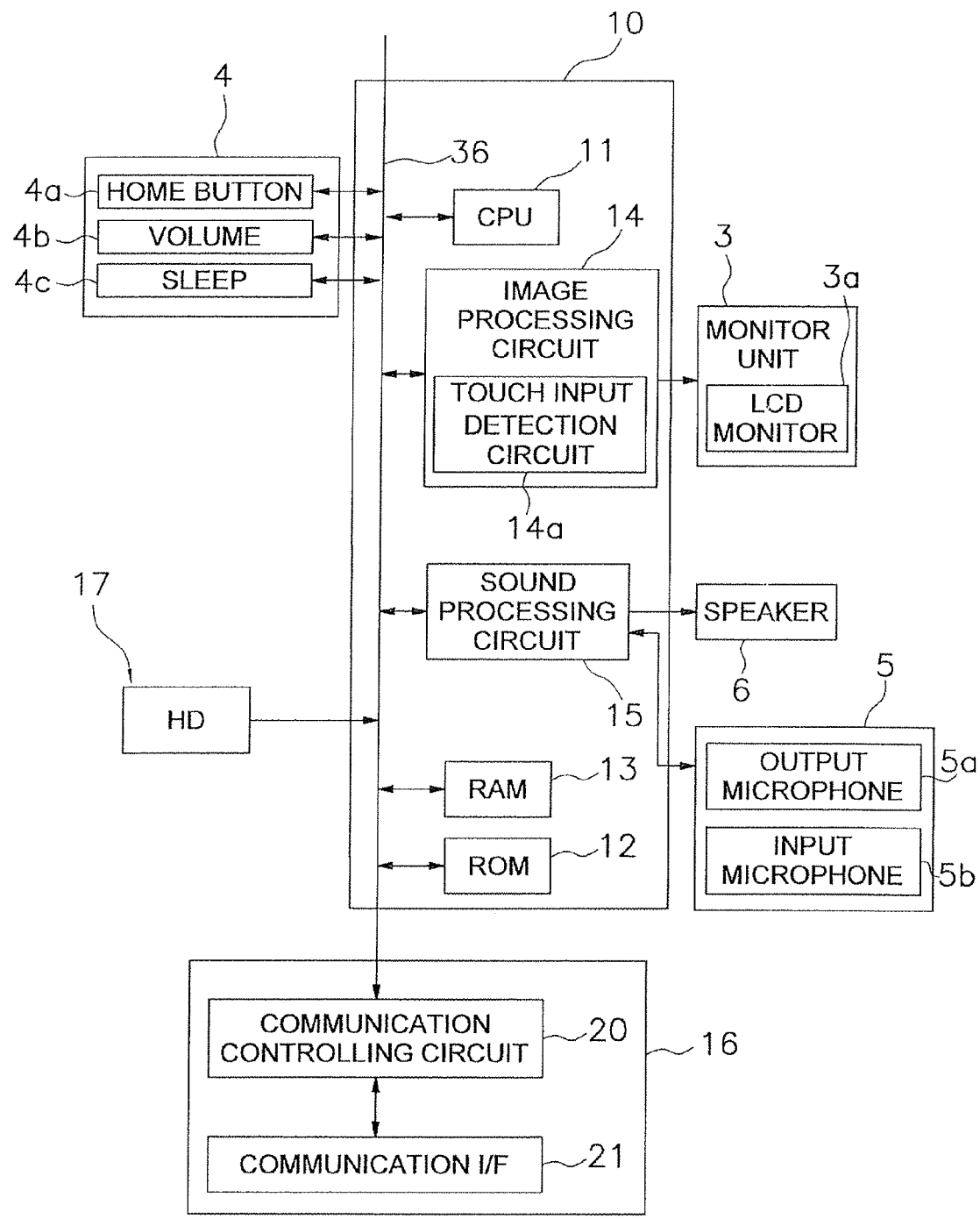
FIG. 2 is a diagram illustrating a hardware configuration of the portable game console.

FIG. 1 is an external view of a portable game console 1 as an exemplary computer that a game program of the present invention can be applied. On the other hand, FIG. 2 is a diagram representing exemplary control blocks of the portable game console 1.

As illustrated in FIG. 1, the portable game console 1 mainly includes a main body 2, a liquid crystal display (LCD) monitor unit 3, a basic operating unit 4, a microphone 5, and a speaker 6. The monitor unit 3 is embedded in the main body 2 and includes a LCD monitor 3a. For example, the LCD monitor 3a is herein designed as a capacitive touch input screen, i.e., a touch panel monitor. The LCD monitor 3a generates an electric field on the entire surface of the touch panel. The surface charge of the LCD surface varies when an instruction section (a finger, a conductive stylus pen, and etc.) is touched onto the touch panel surface generating an electric field thereon. Changes in a surface charge occurs, and the position of the finger, the stylus pen or the like on the touch panel is detected. The touch panel herein used is of a projective capacitance type and is thereby allowed to detect a plurality of points simultaneously.

The basic operating unit 4 includes a home button 4a, a volume button 4b and a sleep button 4c. The home button 4a is disposed below the touch panel on the main body 2. When the home button 4a is pressed, a home screen is configured to be displayed or the portable game console 1 is configured to be activated from a sleep mode. The volume button 4b is disposed on the upper part of the lateral surface of the main body 2. When the upper part of the volume button 4b is pressed, a sound volume is configured to be turned up. When the lower part of the volume button 4b is pressed, a sound volume is configured to be turned down. The sleep button 4c is disposed on the top surface of the main body 2. When the sleep button 4c is pressed, the portable game console 1 is configured to go into the sleep mode.

The microphone 5 includes a sound output microphone 5a and a sound input microphone 5b. The sound output microphone 5a is disposed above the touch panel on the main body 2. The sound output microphone 5a is configured to output sounds, for instance, in executing a video game, executing a telephone communication, or listening to the music. The sound input microphone 5b is embedded in the main body 2 and the output port thereof is disposed on the bottom surface of the main body 2. The sound input microphone 5b is configured to input sounds, for instance, in executing a telephone communication or recording sounds.

The speaker 6 is embedded in the main body 2 and the output port thereof is disposed on the bottom surface of the main body 2. The speaker 6 is configured to output sounds, for instance, in executing a video game, listening to the music, or listening recorded sounds. It should be noted that the game console 1 is provided with other components such as an earphone jack but explanation of the components will be hereinafter omitted.

Further, the portable game console 1 mainly includes a control device 10 as a control unit, a communication unit 16 and a storage device 17 in the inside thereof, as illustrated in FIG. 2. The control device 10 includes a CPU (central processing unit) 11 using a microprocessor, a ROM (read only memory) 12 as a main storage device, a RAM (random access memory) 13, an image processing circuit 14 and a sound processing circuit 15. These components are connected to each other through a bus 36.

The CPU 11 is configured to interpret a command from a game program and execute a variety of controls and data processing. The ROM 12 stores a program and etc. required for basis controls (e.g., a boot control) of the game console 1. The RAM 13 keeps a work area for the CPU 11. The image processing circuit 14 is configured to control the monitor unit 3 in response to a drawing command from the CPU 11 for displaying a predetermined image on the LCD monitor 3*a*. Further, the image processing circuit 14 includes a touch input detecting circuit 14*a*. When the instruction section (e.g., a finger) is contacted onto the touch panel, a contact signal is configured to be provided from the touch input detecting circuit 14*a* to the CPU 11. The CPU 11 accordingly recognizes the contact position. When the instruction section is contacted onto the touch panel at a position where an object is displayed on the LCD panel, a selection signal of the object is configured to be provided from the touch input detecting circuit 14*a* to the CPU 11. The CPU 11 accordingly recognizes the object.

The sound processing circuit 15 is configured to generate an analogue sound signal in response to a sound producing command from the CPU 11 and is configured to output it to the sound output microphone 5*a* and/or the speaker 6. When sounds are inputted through the sound input microphone 5*b*, the sound processing circuit 15 is configured to convert an analogue sound signal into a digital sound signal.

The communication unit 16 has a variety of communication functions, for instance, for executing a data communication in executing a video game and for executing a communication as a mobile phone. The communication function for executing a data communication includes, for instance, a wireless local area network (WLAN) function and an Internet connection function using the WLAN.

The communication unit 16 includes a communication controlling circuit 20 and a communication interface 21. The communication controlling circuit 20 and the communication interface 21 are connected to the CPU 11 through the bus 36. The communication controlling circuit 20 and the communication interface 21 are configured to control and transmit a connection signal for connecting the game console 1 to the WLAN or the Internet via the WLAN in response to a command from the CPU 11. In executing a phone call, on the other hand, the communication controlling circuit 20 and the communication interface 21 are configured to control and transmit a connection signal for connecting the game console 1 to the phone line in response to a command from the CPU 11.

The storage device 17 is embedded in the main body 2 and is connected to the bus 36. For example, a hard disc drive or a flash memory drive, which is functioning as a storage medium, is used as the storage device 17.

It should be noted that interface circuits are intervened between the bus 36 and the respective components as necessary but representation of the circuits are omitted in the figures.

In the game console 1 thus configured, a game program stored in the storage device 17 is configured to be loaded and the loaded game program is configured to be run by the CPU 11. Accordingly, the game console 1 allows a game player to play video games of various categories through the monitor unit 3. Further, the game console 1 is allowed to be connected to the wireless network through the communication controlling circuit 20. Alternatively, the game console 1 is allowed to be connected to another game console through a communication cable or the like. Accordingly, the game console 1 is allowed to send/receive data to/from another game console and execute a match-up type game with another game console.

Overview of Various Processing in Present Game System

For example, a baseball video game is executed in the present game system. A game program for executing the baseball video game is stored in the storage device 17. In executing the baseball video game, the game program is loaded to and executed in the RAM 13.

Figure 3:
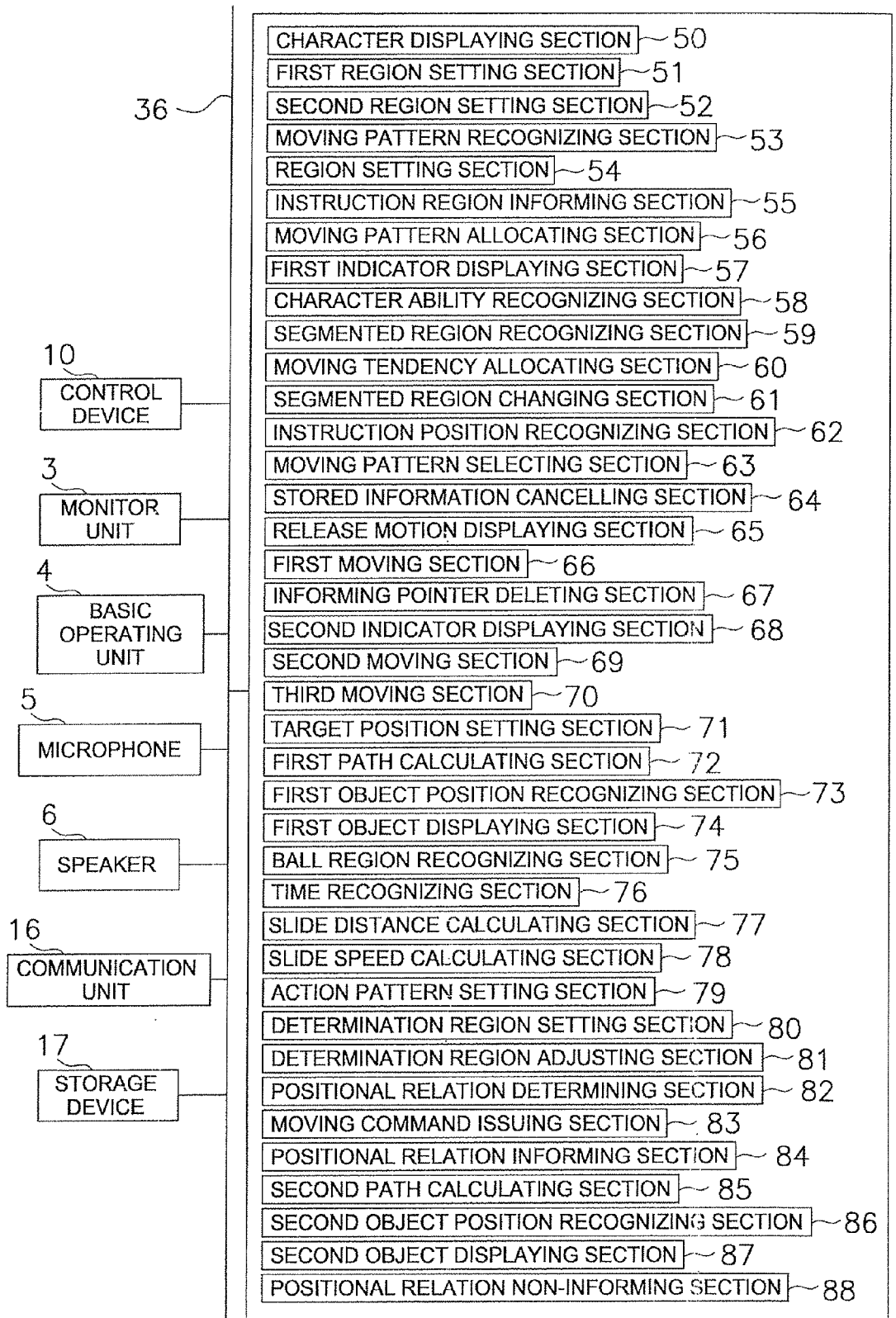
FIG. 3 is an exemplary functional block diagram of the portable game console.

In the baseball video game to be thus executed, a variety of commands are configured to be given when the instruction section (e.g., a finger) is contacted onto the touch panel type LCD monitor 3*a* (hereinafter referred to as "a monitor 3*a*"). FIG. 3 is a functional block diagram for explaining functions playing main roles in the present invention. It should be noted that a frame corresponds to 1/60 of a second in the present baseball video game.

A character displaying section 50 has a function of displaying a pitcher character and a batter character on the monitor 3*a*.

In the character displaying section 50, the pitcher character and the batter character are displayed on the monitor 3*a* using the image data for the respective characters. For example, the pitcher character is herein configured to start a pitching motion when the CPU 11 recognizes the pitch data allocated to any one of display regions for arrows as described below. Further, the batter character is configured to start a swing motion in response to contact of a finger onto the monitor 3*a* as described below.

A first region setting section 51 has a function of causing the CPU 11 to execute a processing of setting a first region to the monitor 3*a*. The first region allows a first round symbol to move therein.

In the first region setting section 51, the CPU 11 executes the processing of setting the first region, allowing the first round symbol to move therein, to the monitor 3*a*. The CPU 11 herein executes the processing of setting the first region to a predetermined range on the monitor 3*a*. The predetermined range, which is set as the first region, is defined in the relative coordinate system having the bottom left corner of the monitor 3*a* as the origin. When the first region is set to be rectangular, for instance, the CPU 11 recognizes the coordinate data of four corners of the first region where the bottom left corner of the monitor 3*a* is set as the origin. The first region is thus set. It should be noted that the coordinate data of four corners of the first region are preliminarily set in the game program and are stored in the RAM 13 in executing the video game.

As described below, a plurality of arrows for pitches are disposed within the first region thus set. Further, the first round symbol is moved within the first region. As described below, the first round symbol corresponds to a round symbol for instructing a pitching course, which is displayed in the center of the arrows for pitches.

A second region setting section 52 has a function of causing the CPU 11 to execute a processing of setting a second region to the monitor 3*a*. The second region allows a second symbol to move therein. The second region is different from the first region.

In the second region setting section 52, the CPU 11 executes the processing of setting the second region, which allows the second round symbol to move therein and is different from the first region, to the monitor 3*a*. The CPU 11 herein executes the processing of setting the second region to a predetermined range on the monitor 3*a*. The predetermined range, which is set as the second region, is defined in the relative coordinate system having the bottom left corner of the monitor 3*a* as the origin. When the second region is set to be rectangular, for instance, the CPU 11 recognizes the coordinate data of four corners of the second region where the bottom left corner of the monitor 3*a* is set as the origin. The second region is herein set to be different from the first region. Therefore, the coordinate data of four corners of the second region are different from those of the first region. The second region is thus set. It should be noted that the coordinate data of four corners of the second region are preliminarily set in the game program and are stored in the RAM 13 in executing the video game.

The second round symbol is moved within the second region thus set. Further, the second round symbol corresponds to, for instance, a pitching course round symbol for setting a pitching course of the ball before the pitcher character releases the ball, as described below.

It should be noted that the first region is set to have the same size as the second region when The monitor 3*a* displays an image in which the pitcher character is viewed from the destination of the pitched ball. In other words, the coordinate data of four corners of the second region are herein set for setting the second region to have the same size as the first region. On the other hand, the second region is set to be smaller than the first region when the monitor 3*a* displays an image in which the destination of the pitched ball is viewed from the pitcher character. In other words, the coordinate data of four corners of the second region are herein set for setting the second region to be smaller than the first region.

A moving pattern recognizing section 53 has a function of causing the CPU 11 to recognize the pitch data for setting a pitch of the ball before the pitcher character releases the ball.

In the moving pattern recognizing section 53, the CPU 11 recognizes the pitch data for setting a pitch of the ball before the pitcher character releases the ball. The CPU 11 herein recognizes the predetermined pitch data that is stored in the RAM 13 and is uniquely set for each pitcher character. When a plurality of pitcher characters exist in the baseball video game, for instance, the CPU 11 recognizes the predetermined pitch data for the respective pitcher characters. It should be noted that the pitch data for the respective pitcher characters are preliminarily set in the game program and are stored in the RAM 13 in executing the video game.

An region setting section 54 has a function of causing the CPU 11 to execute a processing of setting instruction regions for instructing pitches of the ball to the monitor 3*a*.

In the region setting section 54, the CPU 11 executes the processing of setting the instruction regions for instructing pitches of the ball (e.g., display regions for the arrows) to the monitor 3*a*. The CPU 11 herein executes the processing of setting the display regions for the arrows, i.e., regions on the monitor 3*a* for displaying the arrows. For example, the regions for displaying the arrows are set to be in a predetermined range in the relative coordinate system having the bottom left corner of the monitor 3*a* as the origin. The CPU 11 is then caused to recognize the coordinate data within the predetermined range and the regions for displaying the arrows are set.

More specifically, the regions for displaying the arrows are set within the first region. Further, the data for setting the regions for displaying the arrows (i.e., the predetermined range) such as the coordinate data are preliminarily set in the game program. The coordinate data for setting the regions are stored in the RAM 13 in executing the video game.

An instruction region informing section 55 has a function of displaying informing pointers for informing the display regions for the arrows on the monitor 3*a*.

In the instruction region informing section 55, the informing pointers for informing the display regions for the arrows (e.g., arrows for pitches) are displayed on the monitor 3*a* using the image data. Four arrows for pitches are herein configured to be displayed in predetermined positions within the first region on the monitor 3*a*. For example, the arrows for pitches are displayed in the close periphery of the first round symbol moving within the first region (e.g., in the close periphery of a round symbol for instructing a pitching course) on the monitor 3*a*. More specifically, arrows for four pitches are displayed on the monitor 3*a* while being respectively disposed above, below, right and left of the round symbol for instructing a pitching course.

It should be noted that the positions for displaying the arrows for pitches are preliminarily set in the game program. Further, the image data for the arrows are loaded to and stored in the RAM 13 in executing the baseball video game.

A moving pattern allocating section 56 has a function of causing the control unit to execute a processing of allocating the pitch data for setting pitches to the respective arrows for pitches in the first region. Specifically, the moving pattern allocating section 56 has a function of causing the CPU 11 to execute the processing of allocating the pitch data to display regions for the arrows.

In the moving pattern allocating section 56, the CPU 11 executes the processing of allocating the pitch data to the display regions for the arrows. The CPU 11 executes the processing of matching the pitch data with the display regions for the arrows. For example, when arrows for four pitches are displayed on the monitor 3*a* while being disposed above, below, right and left of the round symbol for instructing a pitching course, the following matching is executed: the pitch data for a straight fastball is matched with the display region for the "up" arrow; the pitch data for a split finger fastball is matched with the display region for the "down" arrow; the pitch data for a curveball is matched with the display region for the "left" arrow; and the pitch data for a screwball is matched with the display region for the "right" arrow. When any one of the arrows for pitches is selected by the instruction section (e.g., a finger) as described below, the CPU 11 recognizes the region displaying the selected one the arrows for pitches (i.e., the pitch data allocated to the display region for the selected arrow) based on the aforementioned configuration.

It should be noted that the arrows to which the respective pitch data are allocated are preliminarily set in the game program. In other words, the display regions for arrows matched with the respective pitch data are preliminarily set in the game program. For example, the aforementioned correspondence is set by a corresponding one of correspondence tables uniquely prepared for the respective pitcher characters. The correspondence tables are stored in the RAM 13.

A first indicator displaying section 57 has a function of displaying the first round symbol for instructing a pitching course of the ball on the monitor 3*a* in a predetermined position different from that of a round symbol for setting a pitching course to be described.

In the first indicator displaying section 57, the first round symbol for instructing a pitching course of the ball (e.g., a round symbol for instructing a pitching course to be displayed in the center of the arrows for pitches) is displayed on the monitor 3*a* in a predetermined position different from that of the round symbol for setting a pitching course.

The round symbol for instructing a pitching course is herein displayed in the center position (i.e., a position of the center of mass) of the first region on the monitor 3*a* using the image data for the round symbol. More specifically, the round symbol for instructing a pitching course is displayed on the monitor 3a for positioning the center of mass thereof on the center of mass of the first region. It should be noted that the image data for the round symbol is loaded to and stored in the RAM 13 in executing the baseball video game.

A character ability recognizing section 58 has a function of causing the CPU 11 to recognize the ability data indicating abilities of baseball player characters.

In the character ability recognizing section 58, the CPU 11 recognizes the ability data indicating abilities of baseball player characters. Abilities playing main roles in the present game system include, for instance, contact hitting ability and batting eye of the batter character. The CPU 11 recognizes the ability data for the batter character, which indicate contact hitting ability and batting eye of the batter character, when the batter character appears on the screen.

It should be noted that a plurality of abilities are prepared for the batter character and ability types are preliminarily set in the game program. Further, it should be noted that the following explanation is based on an exemplary case in which the abilities affecting the present game system are contact hitting ability and batting eye of the batter character. Yet further, the following explanation is based on an exemplary case in which predetermined values are uniquely allocated to the ability data for each batter character.

A segmented region recognizing section 59 has a function of causing the CPU 11 to execute a processing of setting a plurality of segmented regions to the inner region of the ball.

In the segmented region recognizing region 59, the CPU 11 executes the processing of setting a plurality of segmented regions to the inner region of the ball. The CPU 11 herein executes the processing of setting a plurality of segmented regions to the inner region of the ball at a predetermined ratio. For example, the CPU 11 recognizes five segmented regions produced by segmenting the inner region of the ball into five regions from top to bottom at a predetermined ratio.

A moving tendency allocating section 60 has a function of causing the CPU 11 to execute a processing of allocating the tendency data to the respective segmented regions. The tendency data herein indicates moving tendencies of the ball after the CPU 11 issues a moving command.

In the moving tendency allocating section 60, the CPU 11 executes the processing of allocating the tendency data, which indicate the moving tendencies of the ball after the CPU 11 issues a moving command, to the respective segmented regions. For example, the CPU 11 allocates the tendency data, which indicate the moving tendencies of "a grounder", "a line drive", "a home run", "a fly", and "a foul tip", to the five segmented regions aligned top to bottom on a one-to-one basis. It should be noted that the correspondence between the respective segmented regions and the tendency data is preliminarily set in the game program. For example, the correspondence is set based on a correspondence table, and the correspondence table is stored in the RAM 13.

A segmented region changing section 61 has a function of causing the CPU 11 to execute a processing of changing the size of at least one of the plural segmented regions based on the ability data indicating abilities of the batter character.

In the segmented region changing section 61, the CPU 11 executes the processing of changing the size of at least one of the plural segmented regions based on the ability data indicating abilities of the batter character. The CPU 11 herein executes the processing of changing the ratio of the segmented regions occupying the inner region of the ball based on the ability data indicating abilities of the batter character for changing the size of at least one of the plural segmented regions.

When the batter character has a high ability of contact hitting or batting eye, for instance, the size of at least any one of the plural segmented regions is changed for increasing the size of segmented regions closer to the center of the ball (e.g., the region for "the line drive", and the region for "the home run"). When a batter character has a low ability of contact hitting or batting eye, in contrast, the size of at least any one of the plural segmented regions is changed for reducing the size of segmented regions closer to the center of the ball (e.g., the regions for "the line drive" and "the home run"). It should be noted that a predetermined ratio for changing the segmented regions in the inner region of the ball, for instance, the changed sizes of the respective segmented regions are preliminarily set in the game program.

An instruction position recognizing section 62 has a function of causing the CPU 11 to recognize the coordinate data indicating a position of the instruction section contacted onto the monitor 3a when the instruction section is contacted onto the monitor 3a.

In the instruction position recognizing section 62, the CPU 11 recognizes the coordinate data indicating the position of the instruction section (e.g., a finger) contacted onto the monitor 3a when the instruction section is contacted onto the monitor 3a. The touch panel herein used is of a projective capacitance type. When a finger is contacted onto the monitor 3a, the touch panel is configured to measure a ratio of electric current based on an electrode pattern of the portion contacted by a finger. The CPU 11 detects and recognizes the coordinate data indicating the position of a finger based on the ratio of an electric current.

It should be noted that the instruction position recognizing section 62 is used for both cases that a game player gives a command to the pitcher character and that a game player gives a command to the batter character. Further, a finger is herein exemplified as the instruction section. However, any suitable things may be used as the instruction section as long as they are conductive.

A moving pattern selecting section 63 has a function of causing the control unit to recognize the aforementioned moving pattern data allocated to any one of the plural arrows for pitches selected by positioning a finger thereon when a finger is positioned on the selected one of the plural arrows for pitches. More specifically, the moving pattern selecting section 63 has a function of causing the CPU 11 to recognize the pitch data allocated to any one of the display regions for arrows selected by positioning a finger therewithin when a finger is positioned within the selected one of the display regions for arrows.

In the moving pattern selecting section 63, the CPU 11 recognizes the pitch data allocated to any selected one of the display regions for arrows when a position on the monitor 3a contacted by a finger is included within the any selected one of the display regions for arrows. The CPU 11 herein recognizes the pitch data allocated to any selected one of the display regions for arrows when the coordinate data, which indicate the position on the monitor 3a contacted by a finger, is matched with the coordinate data of the part enclosed by the boundary of the any selected one of the display regions for arrows. More specifically, the pitch data allocated to any one of the display regions for arrows selected by positioning a finger thereon is recognized by the CPU 11 and is then stored in the RAM 13 when the coordinate data, indicating the position on the monitor 3a contacted by a finger, is matched with the coordinate data of the part enclosed by the boundary of the any selected one of the display regions for arrows, and further, the former coordinate data is matched with the latter coordinate data for a predetermined period of time or more.

A stored information cancelling section 64 has a function of causing the CPU 11 to execute a processing of cancelling the data recognizing processing for cancelling the stored information.

In the stored information cancelling section 64, the CPU 11 executes the processing of cancelling the data recognizing processing for cancelling the stored information. When a finger is herein positioned in the inner part of any selected one of the display regions for arrows for less than a predetermined period of time, for instance, the processing of recognizing the pitch data allocated to the any selected one of the display regions for arrows is canceled. Therefore, the CPU 11 does not recognize the pitch data even if a finger is contacted onto the inner part of any selected one of the arrows displayed on the monitor 3a for a short period of time. A game player is accordingly allowed to easily select another pitch again by moving his/her finger away from the monitor 3a within a short period of time.

A release motion displaying section 65 has a function of causing the CPU 11 to automatically issue a command for making the pitcher character start performing a pitching motion of the ball when the CPU 11 recognizes the pitch data allocated to any selected one of the display regions for arrows in order to display the pitcher character performing the pitching motion of the ball on the monitor 3a.

In the release motion displaying section 65, the CPU 11 automatically issues the command for making the pitcher character start performing a pitching motion of the ball when the CPU 11 recognizes the pitch data allocated to any selected one of the display regions for arrows in order to display the pitcher character performing a pitching motion of the ball on the monitor 3a. When the CPU 11 herein recognizes the pitch data allocated to any selected one of the display regions for arrows, a scene that the pitcher character automatically starts performing a pitching action is displayed on the monitor 3a using the image data for the pitcher character. It should be noted that the image data for the pitcher character is loaded to and stored in the RAM 13 in executing the baseball video game.

A first moving section 66 has a function of causing the CPU 11 to execute a processing of moving the round symbol for instructing a pitching course to the position of a finger when the finger is positioned in the inner part of any selected one of the display regions for arrows in order to display the round symbol for instructing a pitching course on the position of the finger on the monitor 3a.

In the first moving section 66, the CPU 11 executes the processing of moving the round symbol for instructing a pitching course to the position of a finger when the position on the monitor 3a contacted by the finger is included in the inner part of any selected one of the display regions for arrows. The CPU 11 herein executes the processing of changing the coordinate data of the round symbol for instructing a pitching course into the coordinate data of the position on the monitor 3a contacted by a finger when the finger is positioned on the inner part of any selected one of the display regions for arrows. With the configuration, the round symbol for instructing a pitching course is displayed on the position on the monitor 3a contacted by a finger when the finger is positioned on the inner part of any selected one of the display regions for arrows. In other words, the round symbol for instructing a pitching course is moved from the position of the center of mass of the first region to the position on the monitor 3a contacted by a finger.

An informing pointer deleting section 67 has a function of deleting the informing pointers displayed on the monitor 3a when the round symbol for instructing a pitching course is displayed on the position on the monitor 3a contacted by a finger.

In the information pointer deleting section 67, the arrows for pitches (i.e., the information pointers) displayed on the monitor 3a are deleted when the round symbol for instructing a pitching course is displayed on the position on the monitor 3 contacted by a finger. The CPU 11 herein issues a command for deleting the arrows for pitches displayed on the monitor 3a when the round symbol for instructing a pitching course is displayed on the position on the monitor 3a contacted by a finger. Accordingly, the arrows for pitches displayed on the monitor 3a are deleted.

A second indicator displaying section 68 has a function of displaying a second round symbol for setting a target position of the ball on the monitor 3a.

In the second indicator displaying section 68, the second round symbol for setting a target position of the ball (e.g., a round symbol for setting a pitching course of the ball before the pitcher character pitches the ball) is displayed on the monitor 3a. The round symbol for setting a pitching course is herein displayed in the center position (i.e., the position of the center of mass) of the second region on the monitor 3a using the image data for the round symbol. More specifically, the round symbol for setting a pitching course is displayed on the monitor 3a while the center of mass of the round symbol for setting a pitching course is positioned on the center of mass of the second region. It should be noted that the image data for the round symbol is loaded to and stored in the RAM 13 in executing the baseball video game.

A second moving section 69 has a function of causing the CPU 11 to execute a processing of moving the round symbol for instructing a pitching course to the position of a finger in motion when the finger is slid in contact with the monitor 3a in order to display the round symbol for instructing a pitching course on the position of the finger in motion on the monitor 3a.

In the second moving section 69, the CPU 11 executes the processing of moving the round symbol for instructing a pitching course to the position of a finger in motion when the finger is slid in contact with the monitor 3a. The CPU 11 herein recognizes the coordinate data indicating the position of a finger continuously moving on the monitor 3a when the finger is slid in contact with the monitor 3a. The CPU 11 herein executes the processing of changing the coordinate data of the round symbol for instructing a pitching course into the coordinate data recognized by the CPU 11. Accordingly, the round symbol for instructing a pitching course is moved on the monitor 3a in conjunction with movement of a finger when the finger is slid on the monitor 3a. It should be noted that the CPU 11 executes the aforementioned processing on a frame-by-frame basis.

A third moving section 70 has a function of causing the CPU 11 to execute a processing of moving the round symbol for setting a pitching course in conjunction with movement of the round symbol for instructing a pitching course in order to display, on the monitor 3a, a scene in which the round symbol for setting a pitching course is moved from a position different from that of the round symbol for instructing a pitching course in the moving direction of the round symbol for instructing a pitching course.

In the third moving section 70, the CPU 11 executes the processing of moving the round symbol for setting a pitching course in conjunction with movement of the round symbol for instructing a pitching course. The CPU 11 herein executes the processing of moving the round symbol for setting a pitching course displayed on a position different from that of the round symbol for instructing a pitching course in conjunction with movement of the round symbol for instructing a pitching course. When the second region has the same size as the first region, for instance, the CPU 11 executes the processing of moving the round symbol for setting a pitching course displayed on a position different from that of the round symbol for instructing a pitching course in the vector direction of the round symbol for instructing a pitching course by the same amount of displacement as the vector of the round symbol for instructing a pitching course. When the second region is smaller than the first region, on the other hand, the CPU 11 executes the processing of moving the round symbol for setting a pitching course displayed on a position different from that of the round symbol for instructing a pitching course in the vector direction of the round symbol for instructing a pitching course. In this case, the amount of displacement to be used for moving the round symbol for setting a pitching course is calculated by multiplying the magnitude of the vector of the round symbol for instructing a pitching course by a predetermined coefficient that is less than 1. Thus, the monitor 3a displays the scene that the round symbol for setting a pitching course is moved from a position different from that of the round symbol for instructing a pitching course in the moving direction of the round symbol for instructing a pitching course. It should be noted that the CPU 11 executes the aforementioned processing on a frame-by-frame basis.

A target position setting section 71 has a function of causing the CPU 11 to recognize coordinate data indicating the position of the round symbol for setting a pitching course as the coordinate data of a pitching course of the ball in order to set the pitching course of the ball.

In the target position setting section 71, the CPU 11 recognizes the coordinate data indicating the position of the round symbol for setting a pitching course as the coordinate data of the pitching course of the ball in order to set the pitching course of the ball. The coordinate data indicating the position of the round symbol for setting a pitching course is herein recognized by the CPU 11 as the coordinate data of the pitching course of the ball on a frame-by-frame basis and is then stored in the RAM 13.

A first path calculating section 72 (path calculating section) has a function of causing the CPU 11 to execute a processing of calculating a first path of the ball based on the pitch data and the coordinate data of a pitching course of the ball when the CPU 11 issues a command for making the pitcher character pitch the ball.

In the first path calculating section 72, the CPU 11 executes the processing of calculating the first path of the ball (i.e., a path of the ball to be released by the pitcher character) based on the pitch data and the coordinate data of a pitching course of the ball when the CPU 11 issues the command for making the pitcher character pitch the ball. The CPU 11 herein recognizes the coordinate data of a release position of the ball and the angular data indicating a release angle of the ball when the CPU 11 issues the command for releasing the ball. Accordingly, the CPU 11 executes a processing of substituting a variety of data such as the coordinate data of the release position of the ball, the angular data indicating the release angle of the ball, the pitch data, and the coordinate data of the pitching course of the ball into a ball trajectory equation. Thus, the trajectory equation of the ball is set. The processing of deriving the ball trajectory equation corresponds to the processing of calculating the first path of the ball.

It should be noted that the processing explained above can be also interpreted as follows. Simply put, the CPU 11 executes the processing of calculating the first path of the ball (i.e., the path of the ball to be released by the pitcher character) based on the pitch data and the coordinate data of the pitching course of the ball before a game player gives a command to the batter character, i.e., before a finger of a game player is contacted onto the monitor 3a for giving a command to the batter character.

The ball trajectory equation is herein preliminarily set in the game program and is stored in the RAM 13 in executing the video game. Further, the ball trajectory equation is a function of position and time, and variables and constants forming the ball trajectory equation are also preliminarily set in the game program.

A first object position recognizing section 73 (object position recognizing section) has a function of causing the CPU 11 to recognize the coordinate data indicating the position of the ball. Specifically, the first object position recognizing section 73 has a function of causing the CPU 11 to recognize the coordinate data indicating the position of the ball moving on a first path.

In the first object position recognizing section 73, the CPU 11 recognizes the coordinate data indicating the position of the ball moving on the first path when the CPU 11 issues the command for making the pitcher character pitch the ball. The CPU 11 herein automatically issues the command for making the pitcher character pitch the ball when a predetermined period of time elapses after the round symbol for instructing a pitching course is moved to the position of a finger. Accordingly, time is shifted forward from the point of time on the release position of the ball on a frame-by-frame basis in the ball trajectory equation (i.e., a function of position and time) in order to calculate the position of the ball on the first path for each frame. Accordingly, the CPU 11 recognizes the coordinate data, which indicates the position of the ball moving on the first path and is set by the ball trajectory equation, on a frame-by-frame basis.

A first object displaying section 74 (object displaying section) has a function of displaying the ball on the monitor 3a based on the coordinate data indicating the position of the ball. Specifically, the first object displaying section 74 has a function of displaying the ball moving on the first path on the monitor 3a based on the coordinate data on the first path.

In the first object displaying section 74, the ball moving on the first path is displayed on the monitor 3a based on the coordinate data of the ball on the first path set by the ball trajectory equation. The ball moving on the first path is herein displayed on the monitor 3a by displaying the center (i.e., the center of mass) of the ball on a position corresponding to the coordinate data of the ball on the first path. When the CPU 11 herein recognizes the coordinate data on the first path set by the ball trajectory equation on a frame-by-frame basis, the center of the ball is disposed on the position corresponding to the coordinate data and the ball is displayed on the monitor 3a.

A ball region recognizing section 75 has a function of causing the CPU 11 to recognize the inner region of the ball displayed on the monitor 3a based on the coordinate data of the ball on the first path.

In the ball region recognizing section 75, the CPU 11 recognizes the inner region of the ball displayed on the monitor 3a based on the coordinate data of the ball on the first path. The CPU 11 herein recognizes the inner region of the ball displayed on the monitor 3a, i.e., the inner region of the ball formed by a plurality of segmented regions.

A time recognizing section 76 has a function of causing the CPU 11 to recognize the time data indicating a point of time when a predetermined period of time elapses after a finger is contacted onto the monitor 3a.

In the time recognizing section 76, the CPU 11 recognizes the time data indicating a point of time when a predetermined period of time elapses after a finger is contacted onto the monitor 3a. When a command is given to the batter character, the CPU 11 herein recognizes the time data indicating a point of time when a predetermined period of time elapses after contact of a finger onto the monitor 3a is detected for the first time. The point of time when the contact of a finger onto the monitor 3a is detected for the first time herein corresponds to a point of time when the batter character starts performing a swinging motion. Further, the predetermined period of time elapsing after contact of a finger onto the monitor 3a is detected for the first time corresponds to a period of time while the batter character starts performing a swing motion and hits the ball. It should be noted that the predetermined period of time is preliminarily set in the game program and the data corresponding to the predetermined period of time is stored in the RAM 13 in executing the video game.

A slide distance calculating section 77 has a function of causing the CPU 11 to execute a processing of calculating the slide distance of a finger from a position on the monitor 3a contacted by the finger when the finger is slid in contact with the monitor 3a.

In the slide distance calculating section 77, the CPU 11 executes the processing of calculating the slide distance of a finger from the position on the monitor 3a contacted by the finger when the forger is slid in contact with the monitor 3a. The CPU 11 herein calculates the slide distance data indicating the slide distance of a finger slid on the monitor 3a based on the coordinate data indicating the position on the monitor 3a contacted by the finger for the first time and the coordinate data indicating the position on the monitor 3a contacted by the slid finger. For example, the slide distance of a finger is calculated by causing the CPU 11 to execute a processing of substituting the aforementioned coordinate data into the Pythagoras' theorem when the finger is separated away from the monitor 3a. For example, when a contact signal disappears although it is configured to be outputted from the monitor 3a while the finger is contacted onto the monitor 3a.

A slide speed calculating section 78 has a function of causing the CPU 11 to execute a processing of calculating the slide speed of a finger when the finger is slid in contact with the monitor 3a.

In the slide speed calculating section 78, the CPU 11 executes the processing of calculating the slide speed data indicating the slide speed of a finger when the finger is slid in contact with the monitor 3a. The slide speed herein calculated corresponds to the swing speed in the baseball video game. The CPU 11 herein executes the processing of calculating the slide speed data of a finger based on the coordinate data indicating the position on the monitor 3a contacted by the finger for the first time, the coordinate data indicating the position on the monitor 3a contacted by the slid finger and the slide time data indicating a period of time while the finger is slid. For example, the CPU 11 calculates the slide speed data of a finger based on the slide distance data and the slide time data (i.e., the slide speed data of a finger=the slide distance data/the slide time data) when the finger is separated away from the monitor 3a. For example, when a contact signal disappears although it is configured to be outputted from the monitor 3a while the finger is contacted onto the monitor 3a. It should be noted that the CPU 11 counts the time data corresponding to a period of time while a finger is contacted onto the monitor 3a for the first time and is then separated away from the monitor 3a (i.e., the slide time data) on a frame-by-frame basis.

An action pattern setting section 79 has a function of causing the CPU 11 to execute a processing of setting a swing pattern of the batter character with respect to the ball in accordance with a slide distance.

In the action pattern setting section 79, the CPU 11 executes the processing of setting the swing pattern of the batter character with respect to the ball in accordance with the slide distance. Setting of the swing pattern herein depends on the slide distance. For example, any one of the swing patterns of "the compact swing", "the normal swing", and "the full swing" is set in accordance with the slide distance. It should be noted that the correspondence between the magnitudes of the slide distance and the swing patterns is preliminarily set in the game program. For example, the correspondence is set based on a correspondence table and the correspondence table is stored in the RAM 13.

A determination region setting section 80 has a function of causing the CPU 11 to execute a processing of setting a determination region for determining the position of a finger with respect to the region of the ball based on the coordinate data indicating the position on the monitor 3a contacted by the finger.

In the determination region setting section 80, the CPU 11 executes the processing of setting the determination region for determining the position of a finger with respect to the region of the ball based on the coordinate data indicating the position on the monitor 3a contacted by the finger. The CPU 11 herein executes the processing of setting the determination region based on the coordinate data indicating the position on the monitor 3a contacted by a finger in accordance with the swing patterns. The determination region corresponds to a region affecting the ball when the batter character performs a swing motion, i.e., an affecting region of the batter character with respect to the ball. The determination region (i.e., the affecting region) is set on the monitor 3a based on the position on the monitor 3a contacted by the finger for the first time.

The CPU 11 herein executes the processing of setting the determination region for reducing the size of the determination region in proportion to enlargement of the action indicated by the swing pattern. For example, magnitude of the swing motion is increased depending on the swing patterns in the order of "the compact swing", "the normal swing", and "the full swing". Therefore, the CPU 11 sets the size of the determination region to be reduced depending on the swing patterns in the order of "the compact swing", "the normal swing", and "the full swing". More specifically, when the determination region has a circular shape, the setting of the determination region is executed by reducing its radius depending on the swing patterns in the order of "the compact swing", "the normal swing", and "the full swing". In other words, the CPU 11 herein sets a reference determination region for the compact swing, a reference determination region for the normal swing and a reference determination region for the full swing. It should be noted that the correspondence between the respective swing patterns and the sizes of the corresponding determination regions (e.g., radii) is preliminarily set in the game program. For example, the correspondence is set based on a correspondence table and the correspondence table is stored in the RAM 13.

A determination region adjusting section 81 has a function if causing the CPU 11 to execute a processing of adjusting the determination region for reducing the size of the determination region in proportion to increase in a slide distance when the slide distance is greater than a predetermined value.

In the determination region adjusting section 81, the CPU 11 executes the processing of adjusting the determination region for reducing the sixe of the determination region in proportion to increase in a slide distance when the slide distance is greater than a predetermined value. When the determination region herein has a circular shape, the CPU 11 adjusts the determination region for reducing the radius of the determination region in proportion to increase in a slide distance when the slide distance is greater than a predetermined value. When the slide distance is greater than a predetermined value and the swing pattern is "the normal swing", for instance, the CPU 11 adjusts the determination region for reducing the radius of the reference determination region for the normal swing in proportion to increase in a slide distance. When the slide distance is greater than a predetermined value and the swing pattern is "the full swing", on the other hand, the CPU 11 adjusts the determination region for reducing the radius of the reference determination region for the full swing in proportion to increase in a slide distance.

A positional relation determining section 82 has a function of causing the CPU 11 to execute a processing of determining a positional relation between the determination region and the ball displayed on the monitor 3a.

In the positional relation determining section 82, the CPU 11 executes the processing of determining the positional relation between the determination region and the ball displayed on the monitor 3a. Further in the positional relation determining section 82, the CPU 11 executes a processing of determining the positional relation between the adjusted determination region and the ball displayed on the monitor 3a. The CPU 11 herein executes the processing of determining the positional relation between the determination region and the ball displayed on the monitor 3a when a predetermined period of time elapses after a finger is contacted onto the monitor 3a for instructing the batter character to start performing a swing motion (i.e., after the point of time indicated by the time data set in the time recognizing section). It should be noted that the position of the ball when a predetermined period of time elapses has been already herein determined based on the position of the ball when a finger is touched onto the monitor 3a using the aforementioned trajectory equation.

A moving command issuing section 83 has a function of causing the CPU 11 to issue a moving command for moving the ball from its current position to another position when it is determined that the region of the ball and the determination region are overlapped.

In the moving command issuing section 83, the CPU 11 issues the moving command for moving the ball from its current position to another position when the region of the ball and the determination region are overlapped. The CPU 11 herein issues the moving command for moving the ball from its current position to another position when it is determined that the region of the ball and the determination region are overlapped, i.e., when the batter character hits back the ball. More specifically, when the region of the ball and the determination region are overlapped and a finger is moved in contact with the monitor 3a, the CPU 11 issues the moving command for moving the ball from its current position to another position based on the positional relation between the region of the object and the determination region, which is determined by the positional relation determining section.

A positional relation informing section 84 has a function of displaying an image for informing the position of a finger with respect to the ball on the monitor 3a when the CPU 11 issues the moving command.

In the positional relation informing section 84, the image for informing the position of a finger with respect to the ball is displayed on the monitor 3a when the CPU 11 issues the moving command. When the CPU 11 herein issues the moving command, the monitor 3a displays the image for informing one of the segmented regions corresponding to a part of the determination region overlapped with the region of the ball. Specifically, when the CPU 11 issues the moving command, the monitor 3a displays an afterimage of the ball at the moment of being hit and an image for informing one of the segmented regions indicating a part of the determination region overlapped with the region of the ball.

A second path calculating section 85 has a function of causing the CPU 11 to execute a processing of calculating a second path of the ball when it is determined that the ball and the determination region are overlapped.

In the second path calculating section 85, the CPU 11 executes the processing of calculating the second path of the ball (i.e., the path of the ball hit back by the batter character) when it is determined that the ball and the determination region are overlapped. Specifically, the CPU 11 executes the processing of calculating the second path when it is determined that the ball and the determination region are overlapped and the CPU 11 issues the moving command. More specifically, the CPU 11 executes the processing of calculating the second path of the ball based on the swing pattern and the slide speed when it is determined that the ball and the determination region are overlapped and the CPU 11 issues the moving command, i.e., when the batter character hits back the ball. Herein considered for calculating the second path is the tendency data allocated to one of the segmented regions corresponding to a part of the determination region overlapped with the region of the ball.

The CPU 11 herein executes the processing of setting a tendency of a flying pattern of the hit-back ball based on the tendency data allocated to one of the segmented regions corresponding to a part of the determination region overlapped with the region of the ball. Subsequently, the CPU 11 executes the processing of setting the initial speed of the ball corresponding to the swing pattern and the processing of calculating the second path of the ball based on the initial speed of the ball. More specifically, the CPU 11 executes the processing of setting the release angle of the ball corresponding to the flying pattern, the processing of setting the initial speed of the ball corresponding to the swing pattern, the processing of correcting the initial speed of the ball based on the slide speed, and the processing of calculating the second path of the ball based on the corrected initial speed of the ball.

For example, when the batter character hits back the ball, the release angle of the hit-back ball is set based on the tendency data allocated to one of the segmented regions corresponding to a part of the determination region overlapped with the region of the ball, for instance, the tendency data indicating any one of the moving patterns of "the grounder", "the line drive", "the home run", "the fly" and, "the foul tip". The release angle of the hit-back ball is set to be increased depending on the moving patterns in the order of "the grounder", "the line drive", "the home run", "the fly", and "the foul tip". Further when the batter character hits back the ball, the CPU 11 sets the initial speed data of the ball for increasing the initial speed of the ball depending on the swing patterns in the order of "the compact swing", "the normal swing", and "the full swing". Yet further, when the batter character hits back the ball, the speed of the hit-back ball is increased in proportion to increase in a swing speed. Therefore, the CPU 11 corrects the initial speed data of the ball for further increasing the initial speed of the ball uniquely set for the respective swing patterns in proportion to increase in a slide speed. For example, where the initial speed of the ball corresponding to each swing pattern is set as a reference initial speed of each swing pattern, the reference initial speed is corrected in accordance with the swing speed. The CPU 11 then executes the processing of calculating the second path of the ball based on the corrected initial speed of the ball. It should be noted that the correspondence between the swing patterns and the initial speeds of the ball and the correspondence between the swing speeds and the correction coefficients are preliminarily set in the game program. For example, the correspondences are set based on correspondence tables and the correspondence tables are stored in the RAM 13.

The second path of the ball, i.e., the path of the ball hit back by the batter character is set using a trajectory equation of the hit-back ball. The trajectory equation of the ball is a function of position and time. The trajectory equation of the ball and its variables and constants are preliminarily set in the game program. The CPU 11 executes a processing of substituting the corrected initial speed of the ball, the coordinate data of the release position of the ball, the angular data indicating the release angle of the ball and etc. into the trajectory equation. Thus, the trajectory equation of the hit-back ball is set. The processing of deriving the trajectory equation of the hit-back ball corresponds to the processing of calculating the second path of the ball.

A second object position recognizing section 86 has a function of causing the CPU 11 to recognize the coordinate data indicating the position of the ball moving on the second path.

In the second object position recognizing section 86, the CPU 11 recognizes the coordinate data indicating the position of the ball moving on the second path. Time is herein shifted forward from the point of time on the release position of the ball on a frame-by-frame basis in the trajectory equation of the hit-back ball (i.e, a function of position and time) in order to calculate the position of the ball on the second path on a frame-by-frame basis. Accordingly, the CPU 11 recognizes the coordinate data indicating the position of the ball moving on the second path, which is set by the trajectory equation of the hit-back ball, on a frame-by-frame basis.

A second object displaying section 87 has a function of displaying the ball moving on the second path on the monitor 3a based on the coordinate data on the second path.

In the second object displaying section 87, the ball moving on the second path is displayed on the monitor 3a based on the coordinate data on the second path. When the CPU 11 herein recognizes the coordinate data of the ball moving on the second path, which is set by the trajectory equation of the hit-back ball, on a frame-by-frame basis, the ball is displayed on the position indicated by the coordinate data on the monitor 3a.

A positional relation non-informing section 88 has a function of preventing the CPU 11 from issuing a command for informing the position of a finger with respect to the ball when it is determined that the region of the ball and the determination region are not overlapped.

In the positional relation non-informing section 88, the CPU 11 issues the command for restricting the processing of informing the position of a finger with respect to the ball when it is determined that the region of the ball and the determination region are not overlapped. In other words, the position of a finger with respect to the ball is prevented from being informed when it is determined that the region of the ball and the determination region are not overlapped.

Figure 21:
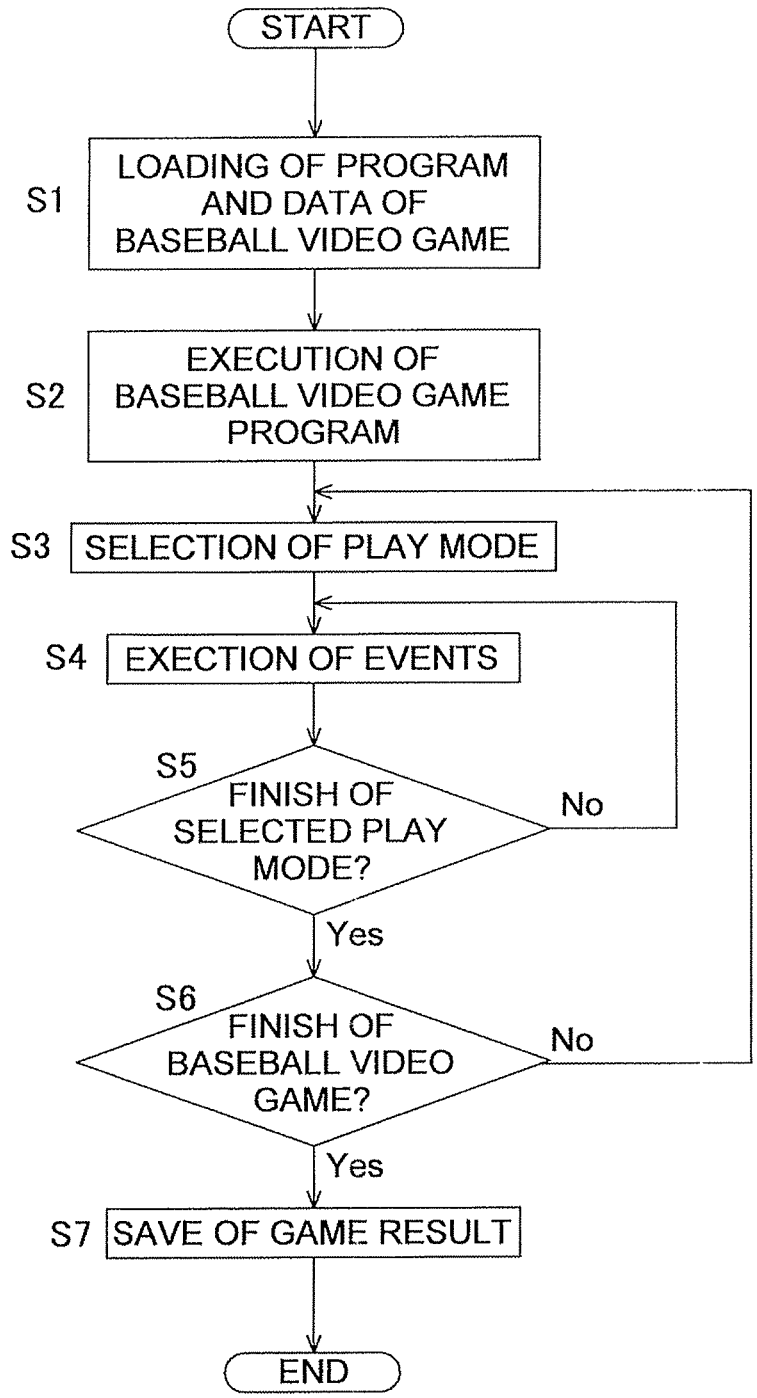
FIG. 21 is a flowchart for explaining a schematic entire baseball video game.
Figure 22:
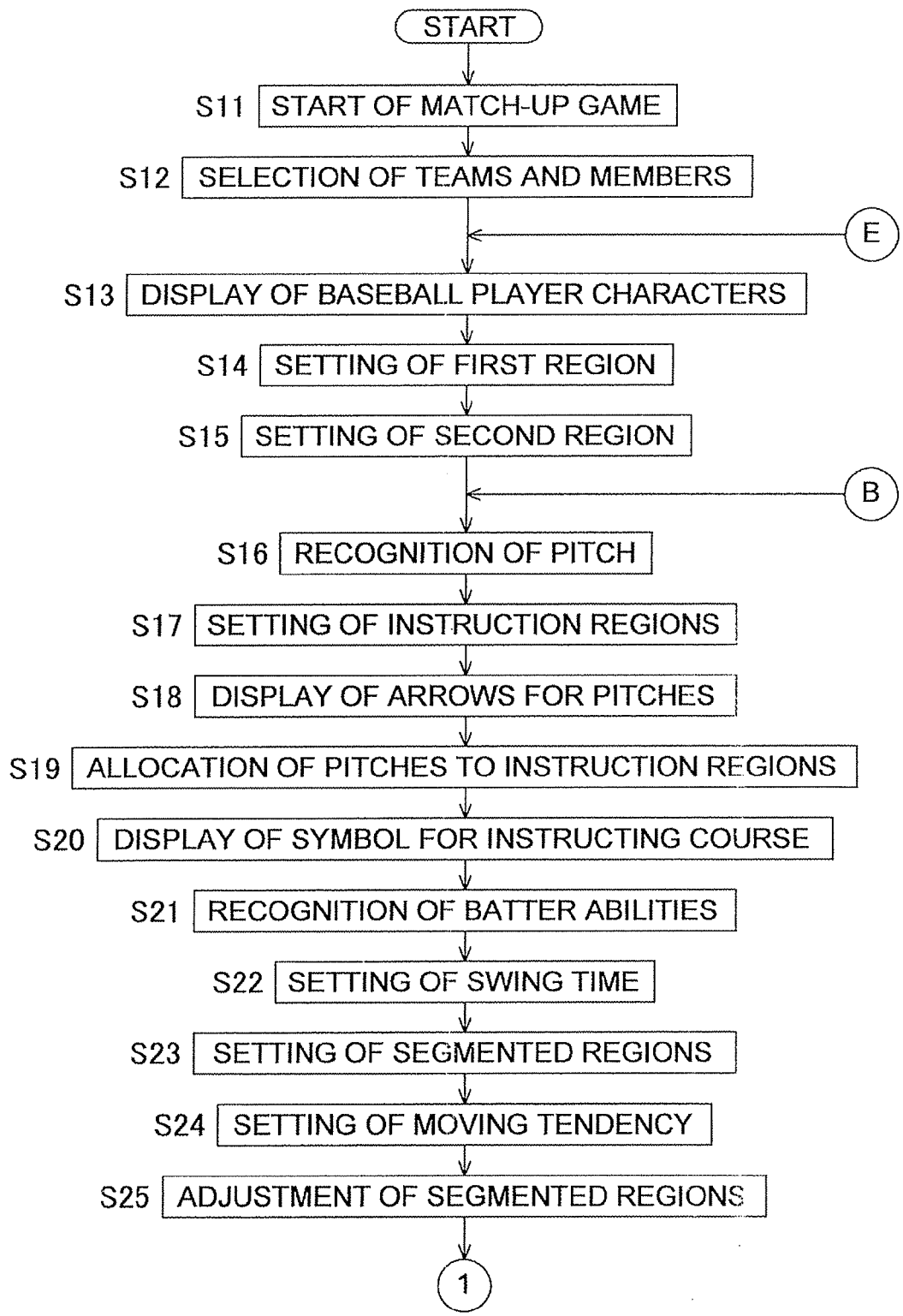
FIG. 22 is a flowchart representing a command instruction system in the baseball video game.
Figure 23:
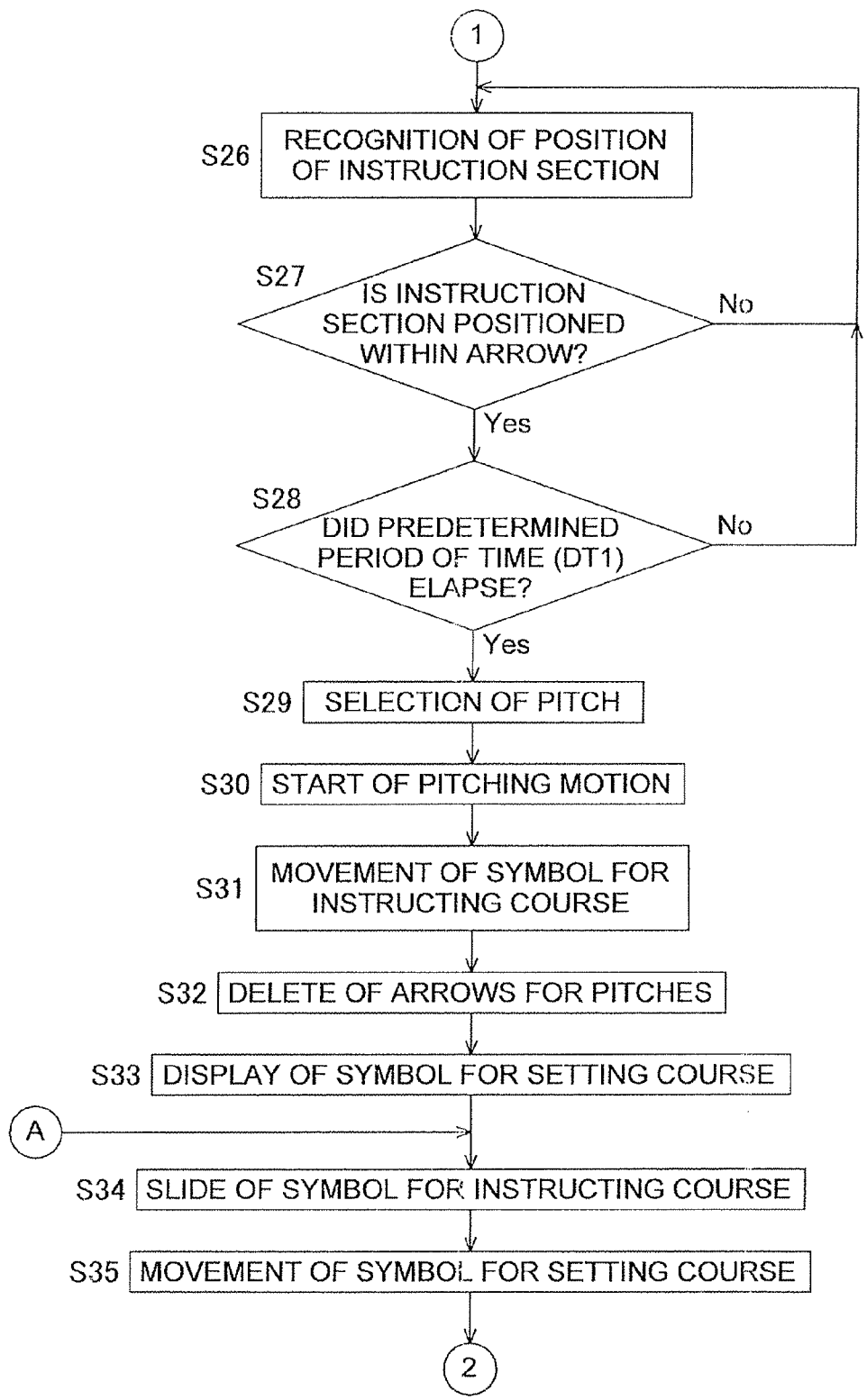
FIG. 23 is a flowchart representing a command instruction system in the baseball video game.
Figure 24:
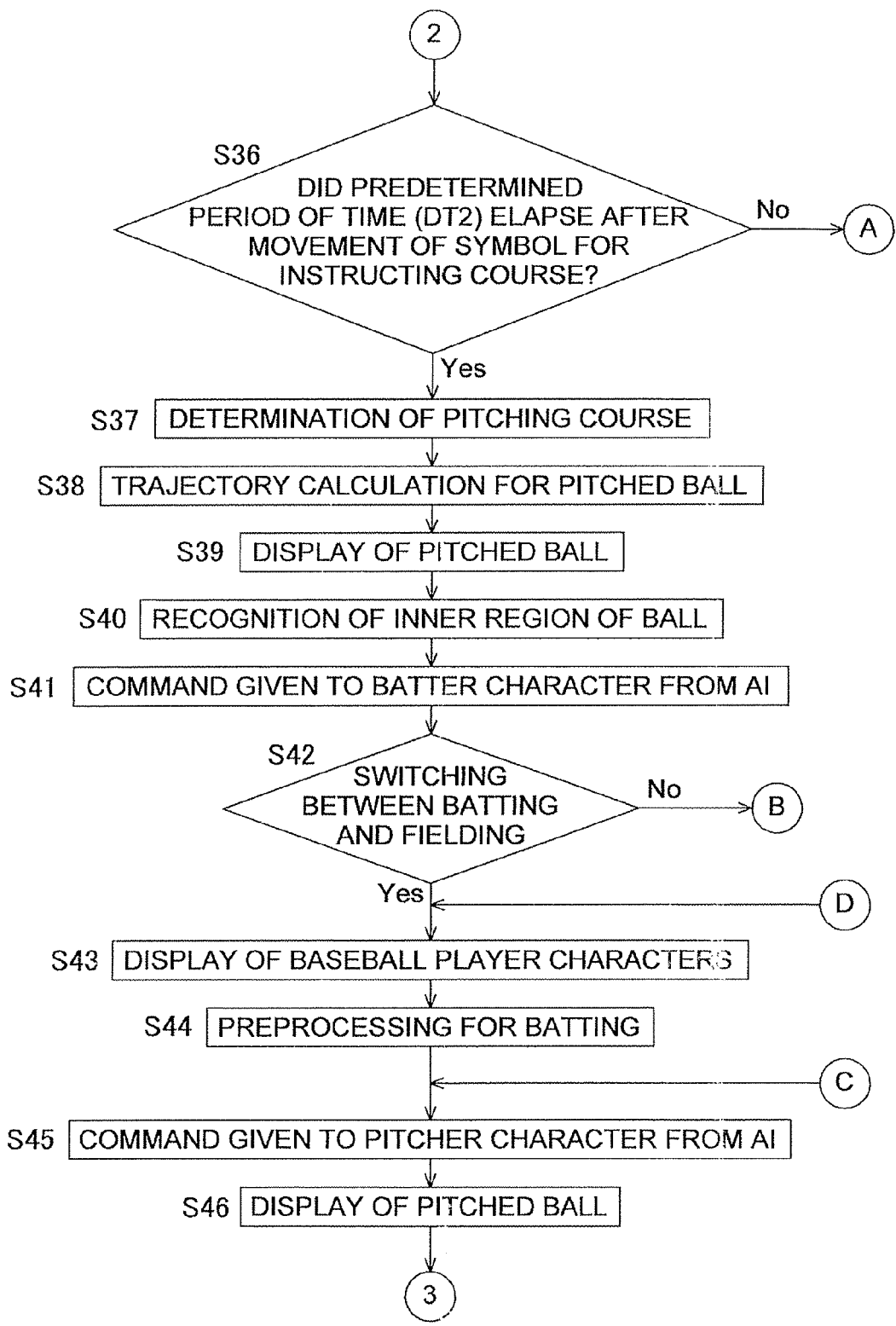
FIG. 24 is a flowchart representing a command instruction system in the baseball video game.
Figure 25:
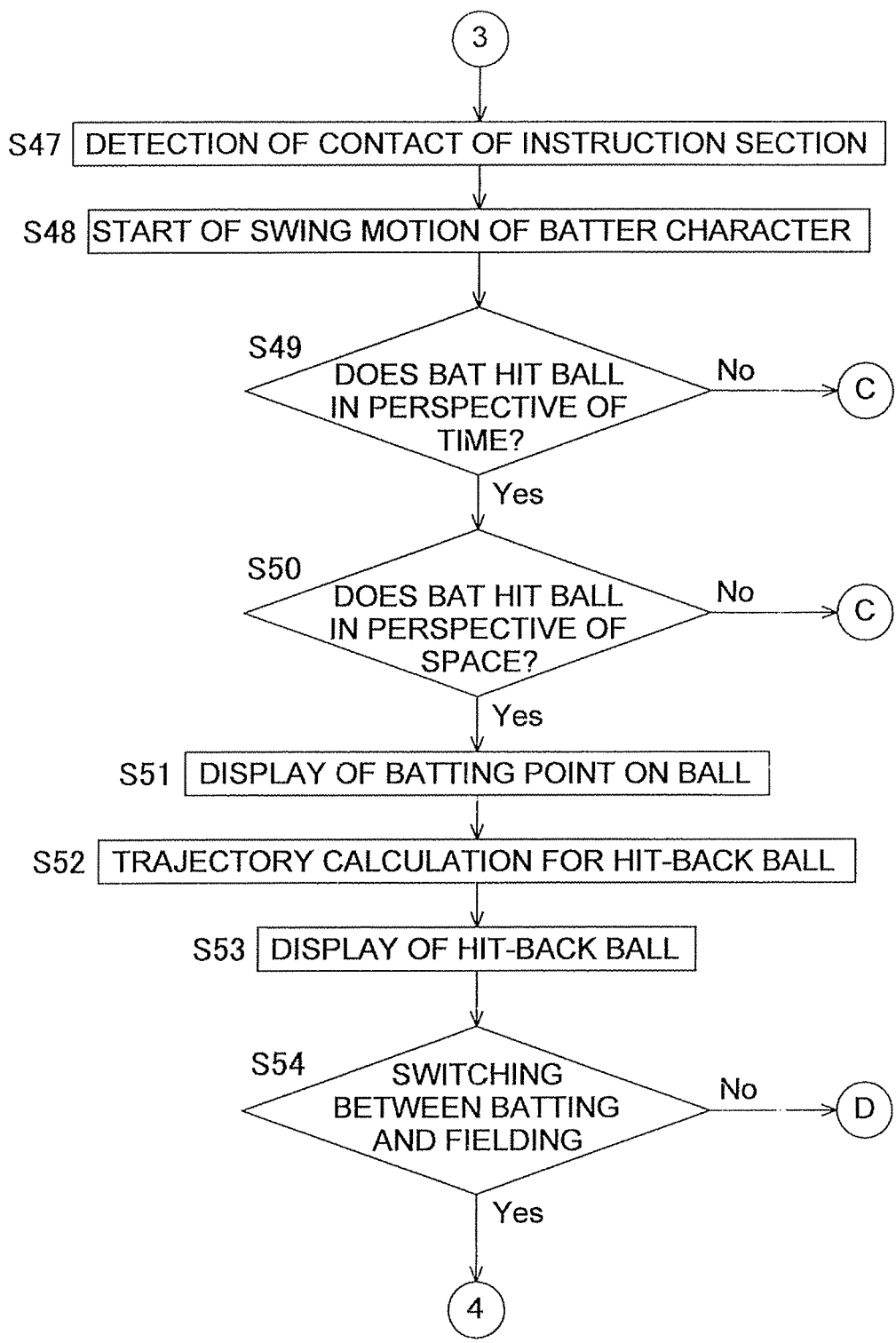
FIG. 25 is a flowchart representing a command instruction system in the baseball video game.
Figure 26:
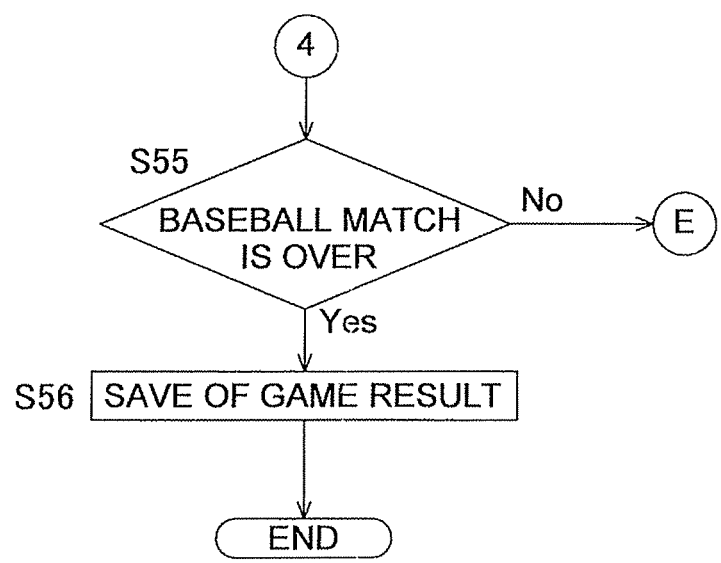
FIG. 26 is a flowchart representing a command instruction system in the baseball video game.

Specifically, the position of a finger with respect to the ball is prevented from being informed when the batter character cannot hit back the ball Summary of Command Instruction System in Baseball Video Game Next, the specific content of the command instruction system in the baseball video game will be hereinafter explained. Simultaneously, flowcharts represented in FIG. 21 and FIGS. 22 to 26 will be also hereinafter explained. It should be noted that FIG. 21 is a flowchart for explaining the overview of the entire baseball video game whereas FIGS. 22 to 26 are flowcharts for explaining the aforementioned system.

Firstly, when the portable game console 1 is powered on and is activated, the baseball video game program is loaded from the storage device 17 (e.g., the hard disc drive) to the RAM 13 and is stored in the RAM 13. Simultaneously, a variety of basic game data required for executing the baseball video game are herein loaded from the storage device 17 to the RAM 13 and is stored in the RAM 13 (Step S1).

The basic game data includes, for instance, data related to a variety of images for a game space. The data related to a variety of images for the game space includes, for instance, the model data for stadiums, the model data for baseball player characters, the model data for a variety of objects and etc. The basic game data further includes the positional coordinate data for disposing the model data (i.e., the data for the game space) in the game space. Further, the basic game data includes the image data for displaying the model disposed in the game space on the monitor 3a. Yet further, the basic game data includes other various data to be used for the present system.

Subsequently, the CPU 11 executes the baseball video game program stored in the RAM 13 based on the basic game data (Step S2). A boot screen of the baseball video game is accordingly displayed on the monitor 3a. A variety of setting screens for executing the baseball video game are then displayed on the monitor 3a. For example, a mode selection screen is herein displayed on the monitor 3a for allowing a game player to select a play mode of the baseball video game (not illustrated in the figures). Determination of a play mode is executed when the game player selects any one of a plurality of play modes displayed on the mode selection screen (Step S3). A variety of play modes such as a match-up mode and a pennant race mode are herein prepared. In the match-up mode, the game player is allowed to select any one of 12 baseball teams and enjoy playing a baseball match with an opponent team. In the pennant race mode, the game player is allowed to select any one of 12 baseball teams and compete with other teams in a pennant race. When a finger of the game player is then contacted onto either a match-up mode button or a pennant race mode button displayed on the monitor 3a, the contacted play mode is selected.

Next, the CPU 11 executes a variety of events in the play mode selected by the game player through the mode selection screen (Step S4). The events herein executed by the CPU 11 include, for instance, events to be automatically controlled by the CPU 11 based on an automatic control program (i.e., an AI (artificial intelligence) program) and events to be manually controlled by the game player based on the input information (i.e., signal) inputted when a finger of the game player is contacted onto the monitor 3a. Further, controls of the baseball player characters include, for instance, an automatic control for automatically giving a command to a baseball player character based on the automatic control program and a manual control for giving a command to a baseball player character based on an input signal from the monitor 3a. Thus, the present baseball video game is configured to control events and give a command to a baseball player character in response to an instruction from the monitor 3a or an instruction from the automatic control program.

It should be noted that the automatic control program herein described is included in the baseball video game program. Further, the automatic control program refers to a program for automatically controlling a command related to an event and a command to be given to a baseball player character instead of the game player. The automatic control program is configured to instruct the CPU 11 to give a variety of commands depending on play conditions.

Next, the CPU 11 determines whether or not the selected play mode is finished (Step S5). Specifically, the CPU 11 determines whether or not a command indicating finish of the play mode has been issued. When the CPU 11 determines that the command indicating finish of the play mode has been issued (Yes in Step S5), the CPU 11 executes a processing of storing the data for continuing the video game in the RAM 13. When the data for continuing the video game is then stored in the RAM 13, a selection screen is displayed on the monitor 3a for allowing the game player to select whether the game player finishes playing the baseball video game (Step S6). When an item indicating finish of the baseball video game is selected on the selection screen through contact of a finger of the game player onto the game monitor 3a (Yes in Step S6), the CPU 11 executes a processing of finishing the baseball video game (Step S7). When an item indicating continuation of the baseball video game is selected on the selection screen through contact of a finger of the game player onto the monitor 3a (No in Step S6), on the other hand, the mode selection screen in Step S3 is redisplayed on the monitor 3a.

It should be noted that the CPU 11 repeatedly executes a variety of events in the play mode selected through the mode selection screen (Step S4) unless it is determined that the CPU 11 has issued the command for finishing the play mode (No in Step S5).

Next, the command instruction system will be hereinafter explained in detail using an exemplary case in which the match-up mode is selected from the plural play modes. Simultaneously, the flowcharts represented in FIGS. 22 to 26 will be also hereinafter explained. In the following explanation, an example case is described that the automatic control program gives a command to a baseball player character of a team A batting first whereas the game player gives a command to a baseball player character of a team B taking the field first.

Figure 4:
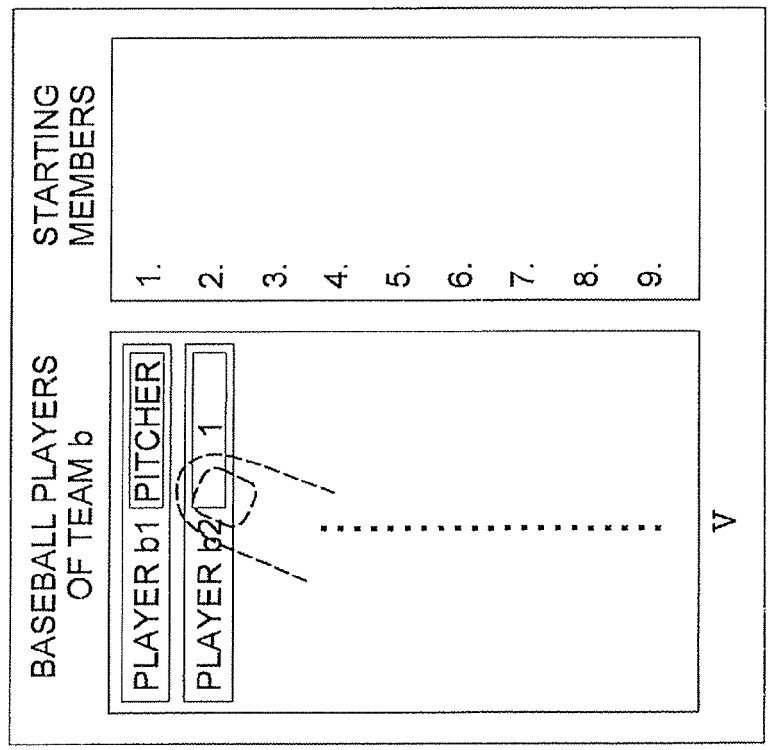
FIG. 4 is a diagram illustrating a member setting screen.
Figure 4:
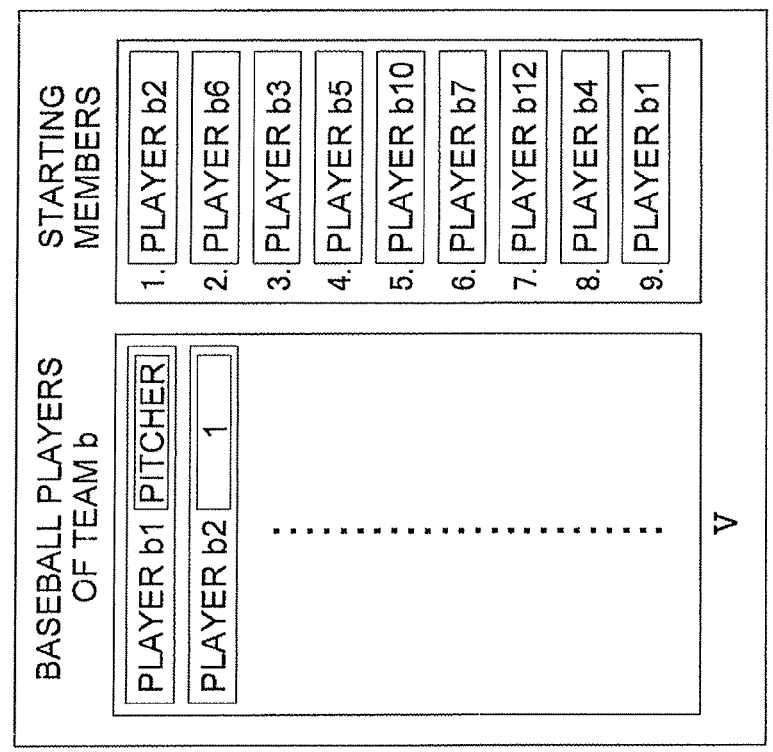

When the match-up mode is selected through the mode selection screen (Step S11) and an opponent team is selected, a member setting screen is displayed on the monitor 3a for setting the starting members of the respective teams. Through the member setting screen, the automatic control program selects baseball player characters of the team A whereas the game player selects baseball player characters of the team B (Step S12). As illustrated in FIG. 4, for instance, the game player is allowed to select desired baseball player characters for the respective fielding positions from a baseball player's list displayed on the monitor 3a using his/her finger. A selected baseball player character is configured to be added to a starting member's list when a finger of the game player is slid to the starting member's list under the condition. The starting members of the team B are set through repetition of the aforementioned operation by the game player. The batting order of the baseball player characters of the team B is set when the game player lists the baseball player characters from top to bottom on his/her desired order. It should be noted that the automatic control program automatically determines the fielding positions and the batting order of the baseball player characters of the team A.

Figure 5:
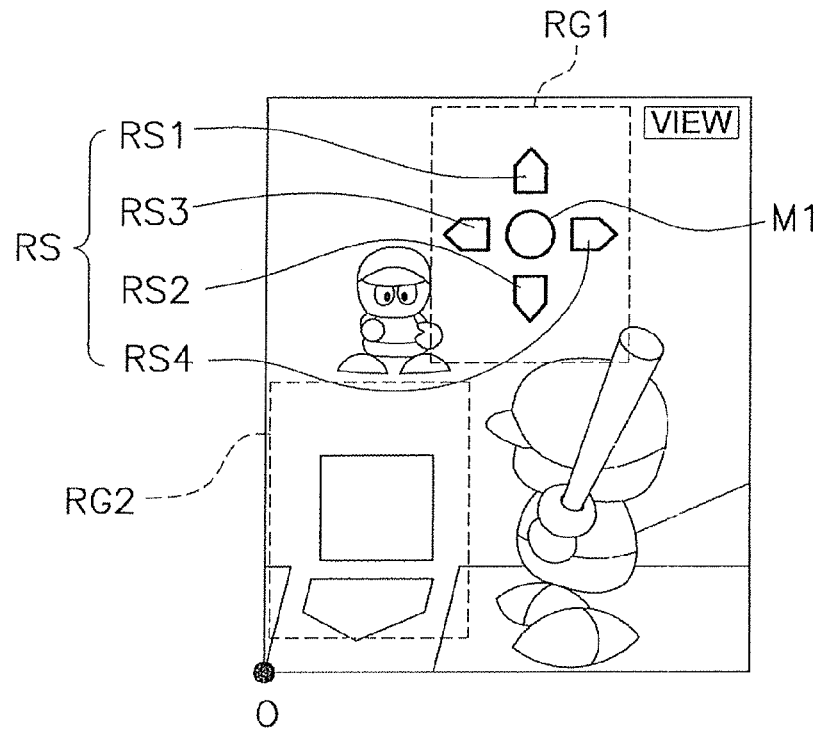
FIG. 5 is a diagram for explaining a screen to be displayed when a pitching instruction is executed (catcher's view).
Figure 6:
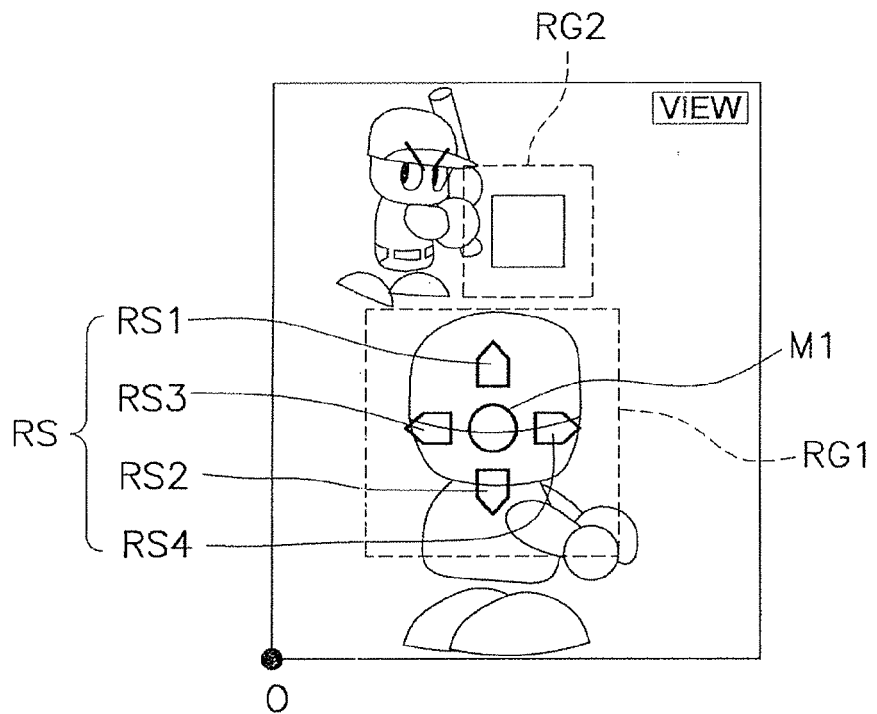
FIG. 6 is a diagram for explaining a screen to be displayed when a pitching instruction is executed (pitcher's view).

When the starting members of the respective teams are thus determined, a pitcher character and a batter character are displayed on the monitor 3a using the image data for the respective characters as illustrated in FIG. 5 (Step S13). As illustrated in FIG. 6, the game player is also allowed to give a command to the pitcher character on the pitcher's view by selecting a button disposed on the top right corner of the monitor 3a. It should be noted that the game player is allowed to redisplay an image seen from the catcher's view illustrated in FIG. 5 by reselecting the button disposed on the top right corner of the monitor 3a.

Subsequently, the CPU 11 executes a processing of setting a second region RG2 to the monitor 3a (Step S14). The second region RG2 herein allows a round symbol for setting a pitching course to move therein. As illustrated in FIG. 5, the second region RG2 is set as a rectangular region positioned in a left lower range of the monitor 3a. The second region RG2 is set by causing the CPU 11 to recognize the predetermined coordinate data of four corners of the second region RG2 where the bottom left corner of the monitor 3a is set as an origin O of the coordinate data. The second region RG2 is not actually displayed on the monitor 3a (although depicted with a broken line in FIGS. 5 and 6). As described below, a round symbol M2 for setting a pitching course is allowed to be moved within the second region RG2.

It should be noted that the coordinates on the monitor 3a are defined where the bottom left corner of the monitor 3a is set as the origin O in the present exemplary embodiment.

Further, the CPU 11 executes a processing of setting a first region RG1 to a range different from that of the second region RG2 on the monitor 3a (Step S15). The first region RG1 herein allows a round symbol M1 for instructing a pitching course to move therein. As illustrated in FIG. 5, the first region RG1 is herein set as a rectangular region positioned in a right upper range of the monitor 3a. The first region RG1 is set by causing the CPU 11 to recognize the predetermined coordinate data of four corners of the first region RG1 where the bottom left corner of the monitor 3a is set as the origin O of the coordinate data. The first region RG1 is not actually displayed on the monitor 3a (although depicted with a broken line in FIGS. 5 and 6). As described below, the round symbol M1 for instructing the pitching course is allowed to be moved within the first region RG1.

It should be noted that the first region RG1 is set to have the same size as the second region RG2 when an image is displayed on the monitor 3a on the catcher's view (i.e., a view that the pitcher character is seen from a ball destination) as illustrated in FIG. 5. On the other hand, the first region RG1 is set to be larger than the second region RG2 when an image is displayed on the monitor 3a on the pitcher's view (i.e., a view that the ball destination is seen from the pitcher character) as illustrated in FIG. 6.

Figures 7, 8, 9:
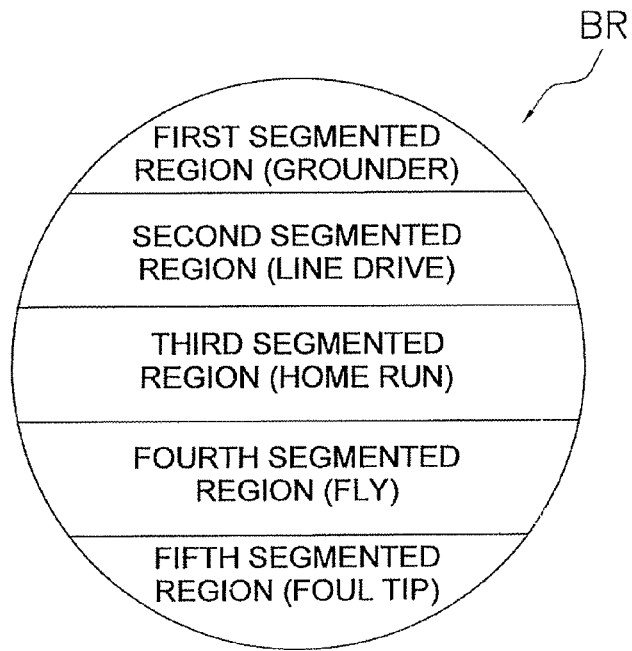
FIG. 7 is a table representing correspondence between display regions and pitch data
FIG. 8 is a schematic diagram illustrating the inner regions of a ball.
FIG. 9 is a table representing correspondence between segmented regions and identification data.

Next, the CPU 11 executes a processing of setting the pitch data K of the pitcher character (Step S16). The CPU 11 herein recognizes the pitch data K of the pitcher character displayed on the monitor 3a, i.e., the pitch data K of the pitcher character currently taking the mound. When the pitcher character currently taking the mound has four pitches of straight fastball, split finger fastball, curveball, and screwball, for instance, the CPU 11 recognizes the pitch data K corresponding to the respective pitches. For example, as represented in FIG. 7, the CPU 11 allocates a numeric value "1" to the pitch data K for straight fastball and allocates a numeric value "2" to the pitch data K for split finger fastball. Further, the CPU 11 allocates a numeric value "3" to the pitch data K for curveball and allocates a numeric value "4" to the pitch data K for screwball.

The case is herein exemplified that the aforementioned four types of pitches are used. However, other types of pitches may be used instead of the aforementioned four pitches.

Next, the CPU 11 executes a processing of setting an instruction region for instructing a pitch of the ball (e.g., display regions RS for arrows) to the monitor 3a (Step S17). The display regions RS for arrows. For example, the regions RS for displaying arrows on the monitor 3a are herein set to predetermined regions on the monitor 3a. Accordingly, informing pointers for informing the display regions RS for arrows (e.g., arrows for pitches) are displayed on the monitor 3a using the image data (Step S18). Four arrows for pitches are herein displayed on the monitor 3a. Specifically, the arrows for pitches are disposed about the round symbol M1 for instructing the pitching course while being disposed above, below, right and left the round symbol M1 for instructing the pitching course.

It should be noted that arrows of pitches (informing images) are indicated by symbols "RS" for indicating the display regions for arrows in FIGS. 5 and 6. However, the images to be actually displayed on the monitor 3a are arrows for pitches. The arrows for pitches are displayed on the monitor 3a while being overlapped with the display regions RS for arrows.

Next, the CPU 11 executes a processing of matching the pitch data K with the display regions RS for arrows (Step S19). As represented in FIG. 7, for instance, the CPU 11 herein allocates: a numeric value "1" to a display region RS1 for a top arrow; a numeric value "2" to a display region RS2 for a bottom arrow; a numeric value "3" to a display region RS3 for a left arrow; and a numeric value "4" to a display region RS4 for a right arrow. The numeric values herein allocated to the respective display regions for arrows correspond to the values of the pitch data K. It should be noted that the correspondence between the display regions and the pitch data K is set based on a correspondence table and the correspondence table is prepared uniquely for each of the pitcher characters.

As illustrated in FIGS. 5 and 6, the round symbol M1 for instructing the pitching course, which is configured to be displayed in the center of the arrows for pitches, is subsequently displayed on the monitor 3a using the image data for the round symbol (Step S20). The round symbol M1 for instructing the pitching course is herein displayed on the monitor 3a using the image data for the round symbol while the center of mass thereof is positioned on the center of mass of the first region RG1.

Next, the CPU 11 recognizes the ability data N (ID) of the batter character (Step S21). For example, the CPU 11 herein recognizes the ability data N (ID) such as abilities of contact hitting and batting eye of the batter character. The CPU 11 is herein caused to recognize the identification data ID for identifying the batter character. Accordingly, the CPU 11 recognizes the ability data N (ID) of each of the baseball player characters. It should be noted that the symbol "N (ID)" herein refers to a symbol generally indicating the abilities of the batter character.

Further, the CPU 11 recognizes a predetermined period of time DTo from a point of time when the batter character starts performing a swing motion to a point of time when it is determined whether or not a bat (i.e., an object) hits the ball (Step S22). As described below, the point of time when the batter character starts performing a swing motion herein corresponds to a point of time when a finger of the game player operating the batter character is contacted onto the monitor 3a for the first time. It should be noted that the time data indicating the predetermined period of time DTo is preliminarily set in the game program and is stored in the RAM 13 in executing the video game.

Next, the CPU 11 executes a processing of setting a plurality of segmented regions to an inner region BR of the ball (Step S23). As illustrated in FIG. 8, the CPU 11 herein sets the inner region BR of the ball to be segmented into five sub-regions vertically aligned at a predetermined ratio. For example, the respective segmented regions are set by causing the CPU 11 to recognize the identification data I for identifying the respective five segmented regions. Specifically, the CPU 11 recognizes numeric values "1", "2", "3", "4", and "5" respectively as the identification data I corresponding to first, second, third, fourth and fifth segmented regions, as represented in FIG. 9. The respective segmented regions are set by thus causing the CPU 11 to recognize the identification data I.

Next, the CPU 11 executes a processing of allocating the tendency data K (I) to the respective plural segmented regions (Step S24). The tendency data K (I) herein indicates moving tendencies of the ball after the CPU 11 issues a moving command. As illustrated in FIG. 8, for instance, moving tendencies of "the grounder", "the line drive", "the home run", "the fly", and "the foul tip" are respectively allocated to the five segmented regions vertically aligned from top to bottom.

Specifically, as represented in FIG. 10, numeric values "1", "2", and "3" are respectively allocated to the tendency data K (1), K (2) and K (3) respectively corresponding to "the grounder", "the line drive", and "the home run". Likewise, numeric values "4", and "5" are respectively allocated to the tendency data K (4) and K (5) respectively corresponding to "the fly" and "the foul tip". It should be noted that the correspondence is preliminarily set in the game program and the correspondence table thereof is stored in the RAM 13.

Next, the CPU 11 executes a processing of adjusting the size of at least one of the plural segmented regions based on the ability data N (ID) indicating abilities possessed by the batter character (Step S25). When at least one of the segmented regions is changed regarding, for instance, batting eye, the CPU 11 executes a processing of changing a ratio of the respective segmented regions occupying the inner region BR of the ball based on the ability data N1 (ID) for batting eye. Accordingly, the size of at least one of the plural segmented regions is changed.

A case is herein exemplified that at least one of the segmented regions is changed regarding batting eye. However, at least one of the segmented regions may be changed regarding any other ability excluding batting eye.

Figure 11:
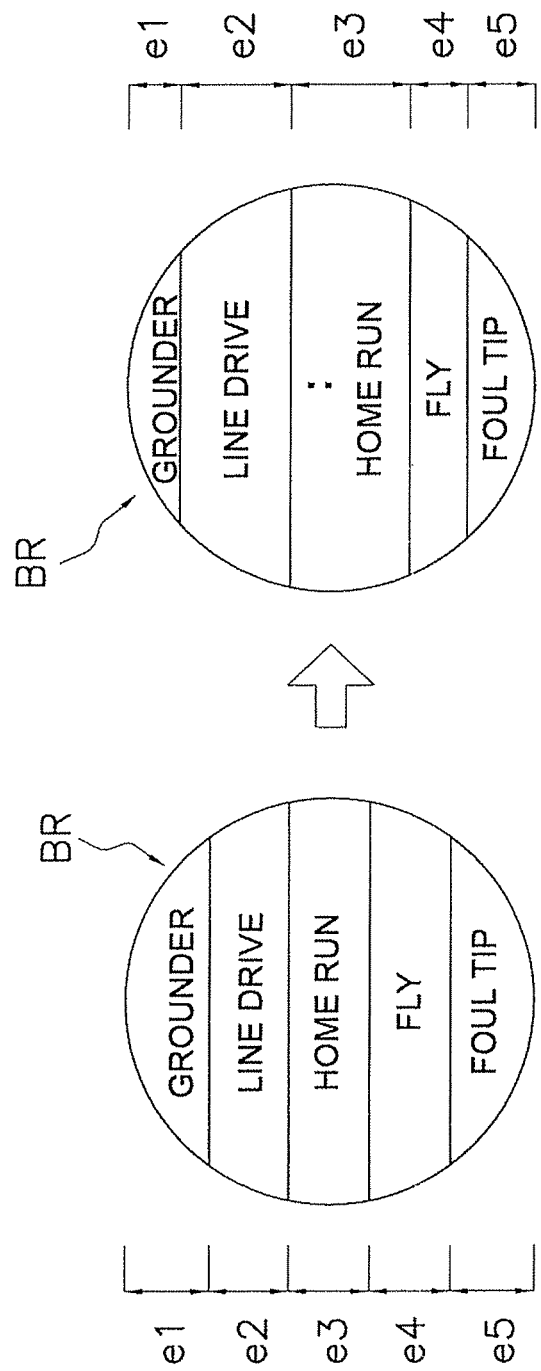
FIG. 11 is a diagram illustrating the segmented regions of post and pre adjustment states.

Change of the size of at least one of the plural segmented regions is specifically executed for increasing the size of at least one of the segmented regions positioned closer to the center of the ball in proportion to increase in a value of the ability data N1 (ID) for batting eye. As illustrated in FIG. 11, adjustment of the sizes of the respective segmented regions is herein executed for increasing the sizes of the regions for "the line drive" and "the home run".

In FIG. 11, the sizes of the respective segmented regions are set based on a vertical ratio. In the initial state, for instance, the ratio of the lengths of the respective segmented regions in the aligned direction (i.e., the vertical direction) is set as "e1:e2:e3:e4:e5=1:1:1:1:1". The ratio of the lengths of the respective segmented regions in the aligned direction is changed by causing the CPU 11 to execute a processing of multiplying the ratio by ability evaluation coefficients n1, n2, n3, n4 and n5 respectively prepared for the segmented regions. The ability evaluation coefficients n1, n2, n3, n4 and n5, respectively prepared for the segmented regions, vary in accordance with the magnitude of the ability data N1 (ID) for batting eye. Each of the ability evaluation coefficients n1, n2, n3, n4 and n5 is set to be a predetermined value in accordance with the magnitude of the ability data N1 (ID) for batting eye where the relations "n1+n2+n3+n4+n5=5, n2>1, n3>1" are established.

It should be noted that the correspondence between the magnitude of the ability data N1 (ID) for batting eye and the ability evaluation coefficients n1, n2, n3, n4 and n5 for setting the sizes of the respective segmented regions is preliminarily set based on a correspondence table, for instance, and the correspondence table is stored in the RAM 13.

Further, the aforementioned exemplary embodiment is configured to set the sizes of the respective segmented regions in accordance with the ability data for batting eye. However, the sizes of the respective segmented regions may be set in accordance with the ability data for slugging ability as another exemplary embodiment. In this case, a segmented region e3 for the home run can be set to be wider than the other segmented regions in proportion to increase in the ability data for slugging ability. Alternatively, the sizes of the respective segmented regions can be set, focusing on the batting order other than the ability data of each of the baseball player characters. This is because the batting order is assumed to reflect the batting abilities of the baseball player characters. In this case, the sizes of the respective segmented regions may be configured to be set only for a baseball player character of a predetermined batting order. For example, amongst all the batter characters, the fourth batter character may be set to have the widest segmented region e3 for the home run. Further, the third batter character may be set to have the second widest segmented region e3 for the home run. Yet further, the fifth batter character may be set to have the third widest segmented region e3 for the home run. On the other hand, the ninth batter character may be set to have the widest segmented region e1 for the grounder and the widest segmented region e5 for the foul tip amongst the all the batter characters. Further, the eighth batter character may be set to have the second widest segmented region e1 for the grounder and the second widest segmented region e5 for the foul tip.

As described above, the segmented regions corresponding to the moving tendencies of the ball (i.e., batting tendencies) are configured to be changed in accordance with the batting abilities of the baseball player characters in the present exemplary embodiment. Therefore, the batting characteristics of the respective batter characters can be reflected to the video game. Further, the game player is allowed to visually check which part of the bat hits the ball with an afterimage in batting as described below (see FIG. 20). Yet further, the game player is allowed to check which of the segmented regions is wide or narrow for the batter character that has just finished batting in its respective batting turns. This makes the game player get more emotionally involved with the batter character.

Figure 12:
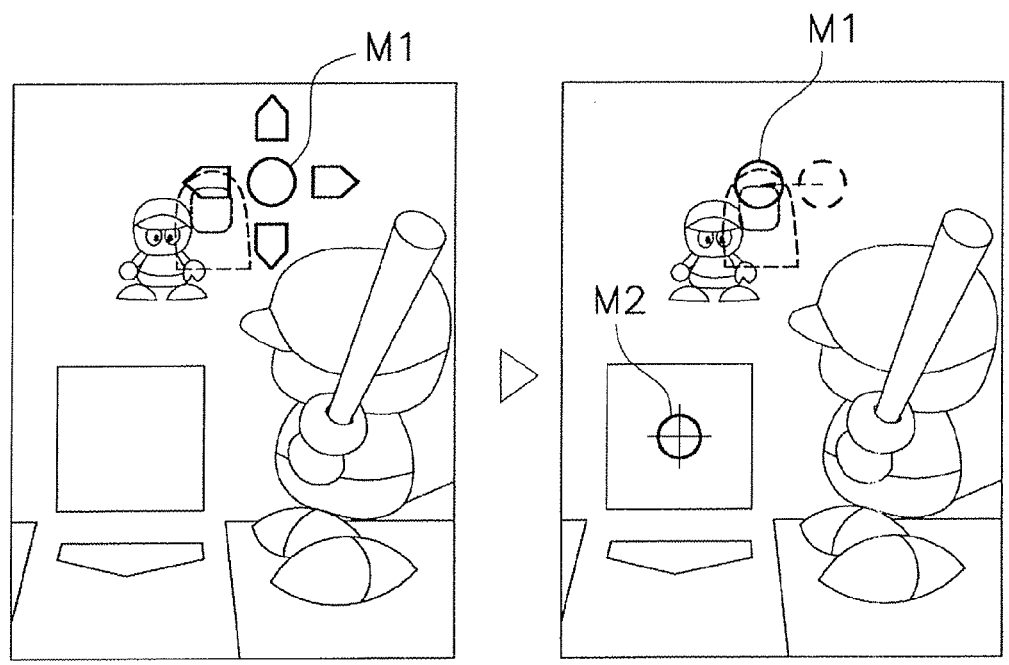
FIG. 12 is a diagram for explaining instruction patterns when a pitching instruction is executed (catcher's view).
Figure 12:
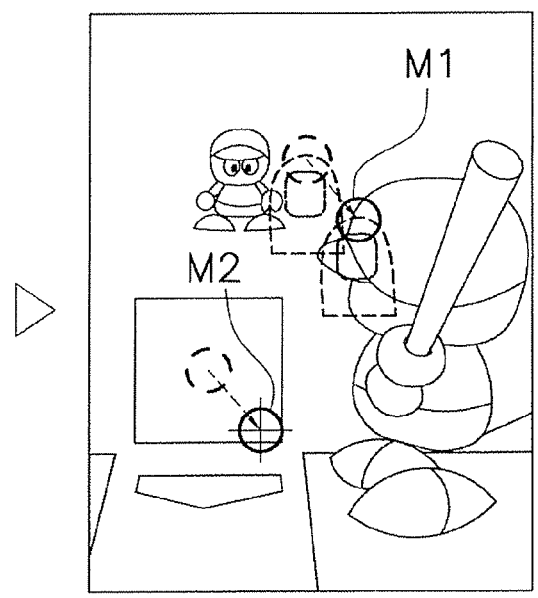

When a finger of the game player is then contacted onto the monitor 3a for giving a command for a pitch to the pitcher character as illustrated in FIGS. 12 (a) and 13 (a), the CPU 11 detects and recognizes the coordinate data indicating the position of the finger (Step S26). The CPU 11 subsequently determines whether or not the coordinate data indicating the position of the finger corresponds to the coordinate data of the inside of any one of the display regions RS for the arrows (Step S27).

When it is determined that the coordinate data indicating the position of the finger contacted onto the monitor 3a corresponds to the coordinate data of at least one of the display regions RS for the arrows (Yes in Step S27), the CPU 11 determines whether or not the coordinate data of the finger is positioned within any one of the display regions RS for the arrows for a predetermined period of time DT1 or more (Step S28).

It should be noted that the CPU 11 executes the processing in Step S26 again when it is determined that the coordinate data indicating the position of the finger contacted onto the monitor 3a does not correspond to the coordinate data of the inside of any one of the display regions RS for the arrows (No in Step S27).

When the coordinate data indicating the position of the finger contacted onto the monitor 3a is positioned within any one of the display regions RS for the arrows for the predetermined period of time DT1 or more (Yes in Step S28), the CPU 11 recognizes the pitch data K allocated to one of the display regions RS for the arrows, which is contacted by the finger (Step S29).

On the other hand, the CPU 11 issues a command for cancelling the data recognition processing when the coordinate data indicating the position of the finger contacted onto the monitor 3a is not positioned within any one of the display regions RS for the arrows for the predetermined period of time DT1 or more (No in Step S28), in other words, when the coordinate data indicating the position of the finger contacted onto the monitor 3a corresponds to the coordinate data indicating the inside of any one of the display regions RS for the arrows for less than the predetermined period of time DT1. In this case, the recognized information is cancelled and the CPU 11 does not thereby recognize the pitch data K. The CPU 11 then executes the processing in Step S26 again.

Specifically, a pitch for the pitcher character is selected when a finger is positioned within any one of the display regions RS for the arrows for the predetermined period of time DT1 or more. On the other hand, the data recognition processing is cancelled and the selection operation of a pitch is cancelled when a finger is positioned within any one of the display regions RS for the arrows for less than the predetermined period of time DT1.

Next, the CPU 11 automatically issues a command for causing the pitcher character to start performing a pitching motion when the CPU 11 recognizes the pitch data K allocated to the selected one of the display regions RS for the arrows (Step S29). Accordingly, the pitching motion of the pitcher character is displayed on the monitor 3a using the image data for the pitcher character (Step S30).

Further, the CPU 11 executes a processing of moving the round symbol M1 for instructing the pitching course to the position of a finger when the CPU 11 recognizes the pitch data K allocated to the selected one of the display regions RS for the arrows (Step S31). The CPU 11 herein executes a processing of converting the coordinate data of the round symbol M1 for instructing the pitching course into the coordinate data of the position of a finger contacted onto the monitor 3a when the finger is positioned within any one of the display regions RS for the arrows. Accordingly, the round symbol M1 for instructing the pitching course is moved to the position of a finger contacted on the monitor 3a, i.e., the position of the finger within any one of the display regions RS for the arrows, as illustrated in FIGS. 12 (b) and 13 (b). In other words, the round symbol M1 for instructing the pitching course is moved from its initial position to the position on the monitor 3a contacted by the finger. The CPU 11 then issues a command for deleting the arrows (informing pointers) for pitches displayed on the monitor 3a. Accordingly, the arrows for pitches displayed on the monitor 3a are deleted (Step S32).

As illustrated in FIGS. 12 (b) and 13 (b), the monitor 3a then displays the round symbol M2 for setting a pitching course of the ball using the image data for the round symbol (Step S33).

The monitor 3a herein displays the round symbol M2 for setting the pitching course using the image data for the round symbol while the center of mass of the round symbol M2 for setting the pitching course is positioned on the center of mass of the second region RG2. The center of mass of the second region RG2 is herein the same as the center of a strike zone. Therefore, the monitor 3a displays the round symbol M2 for setting the pitching course in the center of the strike zone.

When a finger is slid in contact with the monitor 3a under the condition as illustrated in FIGS. 12 (c) and 13 (c), the CPU 11 executes a processing of moving the round symbol M1 for instructing the pitching course, which is displayed on the position on the monitor 3a contacted by the finger, to the position of the finger in motion (Step S34). When the finger is slid in contact with the monitor 3a, for instance, the CPU 11 recognizes the coordinate data indicating the position of the finger continuously moving on the monitor 3a. Accordingly, the CPU 11 recognizes this coordinate data as the coordinate data of the round symbol M1 for instructing the pitching course. The round symbol M1 for instructing the pitching course is accordingly moved on the monitor 3a in conjunction with movement of the finger slid on the monitor 3a. The CPU 11 executes the processing on a frame-by-frame basis.

When the round symbol M1 for instructing the pitching course is thus moved on the monitor 3a, the CPU 11 executes a processing of moving the round symbol M2 for setting the pitching course, which is displayed in a position different from that of the round symbol M1 for instructing the pitching course, in conjunction with movement of the round symbol M1 for instructing the pitching course (Step S35).

For example, when the second region RG2 is the same size as the first region RG1 as illustrated in FIG. 12, i.e., when the monitor 3a displays an image on a catcher character's view (i.e., an image that the pitcher character is seen from the catcher character (i.e., the ball destination)), the CPU 11 executes a processing of moving the round symbol M2 for setting the pitching course in the same direction as the moving direction of the round symbol M1 for instructing the pitching course by the same displacement amount as that of the round symbol M1 for instructing the pitching course.

Figure 13:
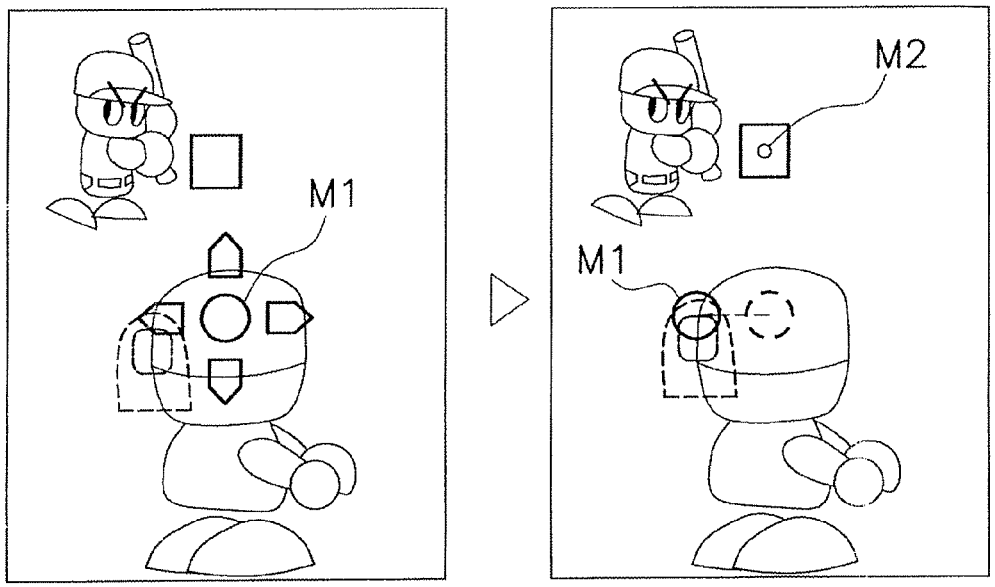
FIG. 13 is a diagram for explaining instruction patterns when a pitching instruction is executed (pitcher's view).

On the other hand, when the second region RG2 is smaller than the first region RG1 as illustrated in FIG. 13, i.e., when the monitor 3a displays an image on a pitcher character's view (i.e., an image that the catcher character (i.e., the ball destination) is seen from the pitcher character), for instance, the CPU 11 executes a processing of moving the round symbol M2 for setting the pitching course, which is displayed in a position different from that of the round symbol M1 for instructing the pitching course, in the same direction as the moving direction of the round symbol M1 for instructing the pitching course. The displacement amount, herein used for moving the round symbol M2 for setting the pitching course, is calculated by multiplying the displacement amount of the round symbol M1 for instructing the pitching course by a predetermined coefficient less than 1. The predetermined coefficient herein used is preliminarily set in the game program in accordance with a size ratio between the second region RG2 and the first region RG1 and is stored in the RAM 13.

Thus, the monitor 3a displays a scene that the round symbol M2 for setting the pitching course is moved in a position different from that of the round symbol M1 for instructing the pitching course in the same direction as the moving direction of the round symbol M1 for instructing the pitching course. In other words, when the round symbol M1 for instructing the pitching course is moved with a finger, the round symbol M2 for setting the pitching course is moved in conjunction with movement of the round symbol M1 for instructing the pitching course. The CPU 11 executes the processing on a frame-by-frame basis.

In Steps S33 and S35, the CPU 11 herein recognizes the coordinate data indicating the position of the round symbol M2 for setting the pitching course as the coordinate data of the pitching course of the ball. For example, the CPU 11 recognizes the coordinate data indicating the position of the round symbol M2 for setting the pitching course as the coordinate data of the pitching course of the ball on a frame-by-frame basis, and the recognized coordinate data is stored in the RAM 13.

Subsequently, the CPU 11 determines whether or not a predetermined period of time DT2 elapses after the round symbol M1 for instructing the pitching course is moved to the position of a finger (Step S36). The round symbol M1 for instructing the pitching course is herein allowed to be moved until the predetermined period of time DT2 elapses after the round symbol M1 for instructing the pitching course is moved to the position of a finger (No in Step S36). In other words, the game player is allowed to instruct the pitching course (i.e., the position of the round symbol M2 for setting the pitching course) by moving the round symbol M1 for instructing the pitching course in this period of time.

On the other hand, when a predetermined period of time elapses after the round symbol M1 for instructing the pitching course is moved to the position of a finger (Yes in Step S36), the CPU 11 recognizes the latest coordinate data of the pitching course as the final coordinate data of the pitching course (Step S37). In other words, the pitching course of the ball is determined based on the final coordinate data of the pitching course. Subsequently, the CPU 11 automatically issues a release command of causing the pitcher character to release the ball. The CPU 11 then executes a processing of calculating a path K1 of the ball (i.e., the first path of the ball) to be released by the pitcher character based on the pitch data K and the coordinate data of the pitching course of the ball (Step S38).

First, the CPU 11 herein recognizes the coordinate data of the release position of the ball and the speed data indicating the release speed of the ball. The CPU 11 then executes a processing of substituting the following initial conditions into a basic equation of the ball: the coordinate data of the release position of the ball, the speed data corresponding to the release speed of the ball, the rotation speed data of the ball corresponding to the pitch data K, the coordinate data of the pitching course of the ball and etc. Thus, a trajectory equation of the ball is derived by substituting the initial conditions into the basic equation of the ball. In other words, the respective coefficients of the basic equation of the ball are determined by substituting the initial conditions into the basic equation of the ball. Further, the trajectory equation of the ball is derived. The processing of deriving the trajectory equation of the ball corresponds to the processing of calculating the first path K1 of the ball. The speed data corresponding to the release speed of the ball is set to be a predetermined value depending on the pitches. Likewise, the rotation speed data of the ball is set to be a predetermined value depending on the pitches. Further, the correspondence between the pitch data K and the speed data and the correspondence between the pitch data K and the rotation speed data are preliminarily set in the game program and correspondence tables thereof are stored in the RAM 13.

It should be noted that the basic equation of the ball is preliminarily set in the game program and is stored in the RAM 13 in executing the video game. Further, the basic equation of the ball is a function of position and time. Variables and constants forming the basic equation of the ball are also preliminarily set in the game program.

When the CPU 11 thus issues the release command and the trajectory equation of the ball is set, the CPU 11 executes a processing of shifting time forward from the point of time on the release position of the ball on a frame-by-frame basis in the trajectory equation of the ball. The CPU 11 then recognizes the coordinate data indicating the position of the ball moving on the first path K1 on a frame-by-frame basis. Thus, the position of the ball moving on the first path K1 is determined on a frame-by-frame basis.

Next, the monitor 3*a* displays the ball moving on the first path K1 based on the coordinate data of the ball set by the trajectory equation of the ball (Step S39). The CPU 11 herein executes a processing of projecting the position of the ball on the first path K1 to a plane SP set in a predetermined position between the pitcher character and the catcher character (i.e., the ball destination). Specifically, the CPU 11 executes a processing of projecting a position BP of the ball on the first path K1 to the plane SP (i.e., an S zone plane) on which a strike zone is set (see FIG. 14). Thus, a ball position MB for displaying the ball on the monitor, i.e., the coordinate data of the ball to be displayed on the monitor is set.

Figure 14:
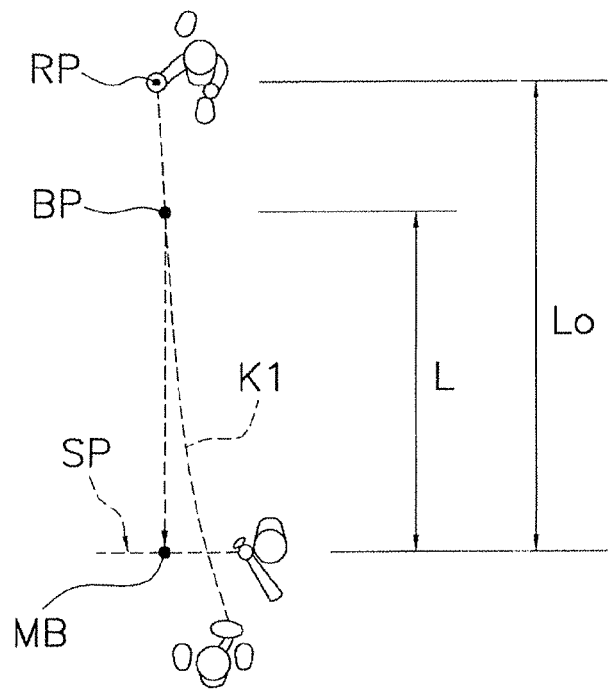
FIG. 14 is a diagram for explaining a setting pattern of a ball image

Subsequently, the CPU 11 calculates the distance between the position of the ball on the first path K1 and the S zone plane SP. The CPU 11 then executes a processing of changing the size of the image data of the ball depending on the distance. In this case, the CPU 11 firstly recognizes a first perpendicular distance Lo between a release position RP of the ball and the S zone plane SP, as illustrated in FIG. 14. When the pitcher character then releases the ball, the ball approaches the S zone plane SP and a second perpendicular distance L between the position BP of the ball and the S zone plane SP is accordingly reduced. The CPU 11 herein executes a processing of dividing the first perpendicular distance Lo by the second perpendicular distance L (Lo/L) and then executes a processing of multiplying the divided result (Lo/L) by a predetermined adjustment coefficient $\alpha$ ($\alpha \times$Lo/L). Further, the CPU 11 executes a processing of multiplying the obtained result by a diameter R of the image data for the ball (R$\times\alpha\times$Lo/L). Accordingly, the diameter R of the image data for the ball is extended.

The CPU 11 then issues a command for disposing the center (i.e., the center of mass) of the modified image data of the ball in the position MB indicted by the aforementioned coordinate data of the ball to be displayed on the monitor. Accordingly, the monitor 3*a* displays a ball PG for allowing the ball PG to be enlarged in proportion to reduction in a distance to the S zone plane SP using the modified image data for the ball (see FIG. 15).

It should be noted that the diameter R of the image data for the ball and the adjustment coefficient $\alpha$ are preliminarily set in the game program and are stored in the RAM 13.

Next, the CPU 11 recognizes the inner region BR of the ball corresponding to the ball image PG displayed on the monitor 3*a* (Step S40). For example, the region of the ball image PG displayed on the monitor 3*a* corresponds to the inner region BR of the ball set in Step S23 on a one-to-one basis. Therefore, recognition of the ball image PG displayed on the monitor 3*a* corresponds to recognition of the inner region BR of the ball formed by a plurality of segmented regions. As illustrated in FIGS. 8 and 11, the CPU 11 herein recognizes the inner region BR of the ball (e.g., five segmented regions vertically aligned at a predetermined ratio) as the regions corresponding to the ball image PG. Specifically, the CPU 11 recognizes the coordinate data of the inside of each segmented region.

In this case, the team directed by the game player (i.e., the team B) takes the field first. The game player therefore gives a command to the pitcher character. On the other hands, the team directed by the automatic control program (i.e., the team A) bats first. The automatic control program therefore gives a command to the batter character. When the pitcher character herein pitches the ball as described above, the batter character, configured to react against the pitched ball, is controlled by the automatic control program.

When the pitcher character releases the ball and the ball approaching the S zone plane SP is displayed on the monitor 3*a* as described above, for instance, the CPU 11 automatically issues a command for causing the batter character to start performing a swing motion based on the automatic control program. Then, a contact hitting region is set based on the automatic control program for determining whether or not the bat hits the ball. The position of the contact hitting region is then predicted based on the automatic control program.

Next, the CPU 11 determines whether or not the contact hitting region and the region of the ball image PG are overlapped when a predetermined period of time elapses after the batter character starts performing a swing motion. When it is determined that the contact hitting region and the region of the ball image are overlapped, it is determined that the bat (i.e., the object) hits the ball. Accordingly, the ball is hit back with the bat. Then, the monitor 3*a* displays the flying ball. When it is herein determined that the contact hitting region and the region of the ball image are not overlapped, it is determined that the bat (i.e., the object) does not hit the ball. Accordingly, the ball is caught by the catcher character. In other words, the batter character swings the bat without hitting the ball.

Thus, the batter character is controlled based on the automatic control program (Step S41). When the ball is herein hit back, the path of the flying ball is calculated based on the tendency data K (I) allocated to any one of the segmented regions overlapped with the contact hitting region. The calculation of the path will be described in detail in (the following explanation) exemplifying a case in which the game player gives a command to the batter character. Further, the other processing executed for the batter character will be described in detail in the following explanation.

When the ball is hit back and the flying ball is displayed from a long shot on the monitor 3*a*, a desired fielder character of the game player is recognized and selected by the CPU 11 when a finger of the game player is contacted onto the desired fielder character displayed on the monitor 3*a*. When the finger of the game player is moved in a desired direction (e.g., towards the ball) under the condition, the monitor 3*a* displays the selected fielder character moving towards the ball. The CPU 11 then determines whether or not the fielder character catches the ball. For example, the CPU 11 determines whether or not the center of mass of the ball is positioned within a predetermined range (e.g., a predetermined circular region) about the position of the fielder character based on the coordinate data of the position of the fielder character and the coordinate data of the position of the ball. When it is determined that the center of mass of the ball is positioned within the circular region, the ball is caught by the fielder character and is thrown in a predetermined direction.

Next, the CPU 11 determines a result of a play and executes the next play. The CPU 11 then determines whether or not three outs are recorded as a play condition (Step S42). When it is determined that three outs are recorded as a play condition (Yes in Step S42), batting and fielding of the teams A and B are switched. Specifically, the game player gives a command to the batter character whereas the automatic control program gives a command to the pitcher character in subsequent plays.

It should be noted that the CPU 11 repeatedly executes Step S16 until three outs are recorded as a play condition when it is determined that three outs have not been recorded yet as a play condition (No in Step S42).

When the CPU 11 then controls the pitcher character based on the automatic control program (Yes in Step S42), the monitor 3a displays the pitcher character and the batter character using the image data for the respective characters (Step S43). Accordingly, the CPU 11 executes a preprocessing for batting, for instance, the aforementioned processing from Step S21 to Step S25 (Step S44).

The CPU 11 accordingly issues a command of a pitch and a command of a pitching course to the pitcher character based on the automatic control program. The CPU 11 then recognizes the pitch data K and the coordinate data of the pitching course, while the trajectory equation is set for the ball to be pitched by the pitcher character as described above. When the pitcher character then releases the ball (Step S45), the monitor 3a displays a scene that the ball moving on the first path K1 is enlarged in proportion to reduction in a distance to the S zone plane SP using the image data for the ball as described above (Step S46).

When the pitcher character is herein controlled based on the automatic control program, the monitor 3a does not display the aforementioned arrows for pitches. Further, the first path K1 is set based on the trajectory equation as described above.

Figure 15:
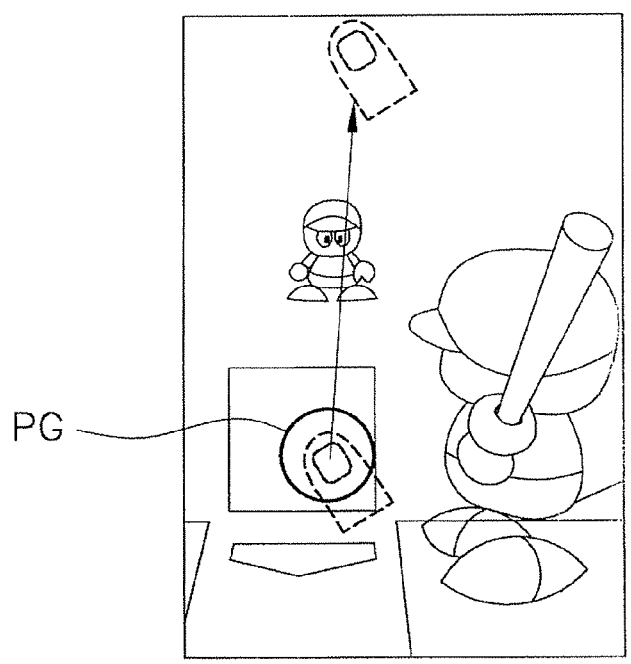
FIG. 15 is a diagram for explaining an instruction pattern when a batting instruction is executed.

When a finger of the game player is then contacted onto the monitor 3a for hitting back the ball as illustrated in FIG. 15 while the monitor 3a displays the ball pitched by the pitcher character (Step S47), the CPU 11 recognizes the time data indicating a point of time when the finger is contacted onto the monitor 3a. The point of time indicated by the time data corresponds to a point of time when the batter character starts performing a swing motion. In other words, the CPU 11 determines that the batter character starts performing a swing motion when a finger of the game player is contacted onto the position of the ball displayed on the monitor 3a (Step S48).

The CPU 11 then recognizes a point of time when the predetermined period of time DTo elapses after a finger is contacted onto the monitor 3a. As described below, the CPU 11 determines whether or not the bat can hit the ball in the point of time. In other words, the point of time corresponds to the timing when the batter character hits the ball after starting performing a swing motion.

The CPU 11 then determines whether or not the batter character can hit the ball from the perspective of time (Step S49). The determination whether or not the batter character can hit the ball from the perspective of time is executed as follows. For example, the CPU 11 firstly recognizes the position of the ball when the predetermined period of time DTo elapses after a finger is contacted onto the monitor 3a. As illustrated in FIG. 16, the CPU 11 then determines whether or not the position of the ball at the point of time is included in a predetermined range LR ranging from the S zone plane SP. The predetermined range LR is set to be ranged from the S zone plane SP in a direction perpendicular to the S zone plane SP. Further, the predetermined range LR corresponds to a range in which the batter character can hit the ball. It is then determined that the batter character can hit the ball in the perspective of time if the position of the ball is included in the predetermined range LR when the predetermined period of time DTo elapses after a finger is contacted onto the monitor 3a. Simply put, this (Yes in Step S49) indicates that the game player could give the batter character a command for starting a swing motion at an appropriate timing.

On the other hand, it is determined that the batter character could not hit the ball in the perspective of time if the ball is positioned outside the predetermined range LR when the predetermined period of time DTo elapses after a finger is contacted onto the monitor 3a. Simply put, this indicates that the game player could not give the batter character a command for starting a swing motion an appropriate timing. Therefore, this (No in Step S49) indicates that the batter character swung the bat without hitting the ball and the CPU 11 executes the processing in Step S45 again.

Next, when the batter character could hit the ball in the perspective of time (Yes in Step S49), the CPU 11 determines whether or not the batter character can hit the ball in the perspective of space (Step S50). The determination whether or not the batter character can hit the ball in the perspective of space is executed as follows.

As illustrated in FIG. 15, for instance, the CPU 11 executes a processing of calculating the slide distance of a finger from the position on the monitor 3a contacted by the finger when the finger is slid in contact with the monitor 3a. The CPU 11 herein calculates the slide distance data LS indicating the slide distance of a finger when the finger is slid on the monitor 3a based on the coordinate data indicating the position on the monitor 3a contacted by the finger for the first time and the coordinate data indicating the position on the monitor 3a where the finger is slid thereon and then separated away therefrom.

Further, the CPU 11 executes a processing of calculating the slide speed data SV, indicating the slide speed of a finger, when a finger of the game player is slid in contact with the monitor 3a. For example, the CPU 11 executes a processing of calculating the slide speed data SV of a finger based on the slide distance data LS indicating the slide distance and the slid time data TS indicating the slid time (SV=LS/TS). It should be noted that the slide time is a period of time while a finer is contacted onto the monitor 3a and is then separated away from the monitor 3a. When it herein takes a predetermined period of time or more while a finger is contacted onto the monitor 3a and is then separated away from the monitor 3a, the slide time is set to be the predetermined period of time.

The aforementioned action of sliding a finger in contact with the monitor 3a imitates the swing motion of the batter character. The game player is thereby allowed to intuitively and directly give a batting command to the batter character.

Next, the CPU 11 executes a processing of setting a swing pattern of the batter character with respect to the ball in accordance with the slide distance. Any one of the swing patterns of "the compact swing", "the normal swing", and "the full swing" is herein set as the swing pattern of the batter character in accordance with the magnitude of the slide distance data LS. For example, the CPU 11 executes a processing of allocating the data for the compact swing (e.g., "1") to the swing pattern data SK when the slide distance data LS is greater than or equal to zero and less than or equal to a first distance X1 as represented in FIG. 17. Further, the CPU 11 executes a processing of allocating the data for the normal swing (e.g., "2") to the swing pattern data SK when the slide distance data LS is greater than the first distance X1 and less than or equal to a second distance X2. Yet further, the CPU 11 executes a processing of allocating the data for the full swing (e.g., "3") to the swing pattern data SK when the slide distance data LS is greater than the second distance X2. Thus, the swing patterns are set to correspond to the slide distance data LS.

It should be noted that the first distance X1 and the second distance X2 are preliminarily set in the game program and are stored in the RAM 13. Further, a relation "X1<X2" is established between the first distance X1 and the second distance X2.

When the swing pattern of the batter character with respect to the ball is thus set, the CPU 11 executes a processing of setting a circular reference determination region in accordance with the swing patterns based on the coordinate data indicating the position on the monitor 3a contacted by a finger. The circular reference determination region is herein set by causing the CPU 11 to recognize the radius data R1, R2 and R3 of the reference determination region that is configured to be smaller in proportion to enlargement of a swing motion. Accordingly, the baseball video game can duplicate such a situation of a baseball match in the real world that it becomes further difficult for a baseball player to hit the ball with the bat in proportion to enlargement of a swing motion.

It should be noted that the radius data R1, R2 and R3, respectively corresponding to the swing pattern data SK, are preliminarily set in the game program and are stored in the RAM 13. For example, a relation "the radius data R1 for the compact swing>the radius data R2 for the normal swing>the radius data R3 for the full swing" is established among the radius data.

When the slide distance data LS is less than or equal to the first distance X1, i.e., in the case of "the compact swing", the CPU 11 executes a processing of allocating a predetermined value to the adjustment data CD indicating a coefficient for adjusting the reference determination region. As represented in FIG. 18, the CPU 11 herein allocates a value of "1.0" to the adjustment data CD. The CPU 11 then executes a processing of multiplying the radius data R1 by the adjustment data CD (i.e., R1'=R1×CD=R1×1.0). Thus, the determination region is adjusted. In this case, an adjusted determination region RH has the same size as the reference determination region. In other words, adjustment of the determination region is not executed when the slide distance data LS is less than or equal to the first distance X1.

On the other hand, the CPU 11 sets the adjustment data CD for further reducing the size of the determination region in proportion to increase in the slide distance data LS when the slide distance data LS is greater than the first distance X1 but less than a third distance X3, i.e., in either of the cases of "the normal swing" and "the full swing". As represented in FIG. 18, the CPU 11 herein allocates a predetermined value to the adjustment data CD in accordance with the value of the slide distance data LS. The CPU 11 then executes a processing of respectively multiplying the radius data R2 and R3 by the adjustment data CD (i.e., R2'=R2×CD, R3'=R3×CD). Thus, the determination region is adjusted. In this case, the adjusted determination region RH is smaller than the reference determination region.

Further, the adjustment data CD is fixed to be a predetermined value (=0.3) in the case of "the full swing", especially when the slide distance data LS is greater than or equal to the third distance X3 as represented in FIG. 18. Even when the game player extremely widely slides the instruction section for hitting the ball far (i.e., when the slide distance exceeds the upper limit X3), the determination region is fixed to a predetermined size (i.e., the determination region is not reduced to an extremely small point such as a pinpoint). Therefore, it is possible to avoid such a drawback that contact hitting of the ball is not achieved.

Thus, the determination region is adjusted in accordance with the slide distance data LS, i.e., the magnitude of the swing motion in the cases of "the normal swing" and "the full swing". Simply put, the determination region is adjusted for making it further difficult to hit the ball with the bat in proportion to enlargement of the swing motion. It should be noted that the correspondence represented in FIG. 18 is preliminarily set in the game program and is stored in the RAM 13.

Next, the CPU 11 executes a processing of determining a positional relation between the region of the ball image PG and the adjusted determination region RH. For example, the CPU 11 executes a processing of determining a positional relation between the adjusted determination region RH and an region BG of the ball image PG (i.e., a prospective region) to be displayed on the monitor 3a when a predetermined period of time elapses after a finger is contacted onto the monitor 3a for giving the batter character a command for starting a swing motion. It should be noted that the first path K1 of the ball has been already set by the trajectory equation. It is thereby possible to determine the prospective position of the ball when a predetermined period of time elapses after a finger of the game player is contacted onto the monitor 3a based on the trajectory equation. The prospective region BG of the ball image PG is set by projecting the prospective position of the ball to the S zone plane SP.

Figure 19:
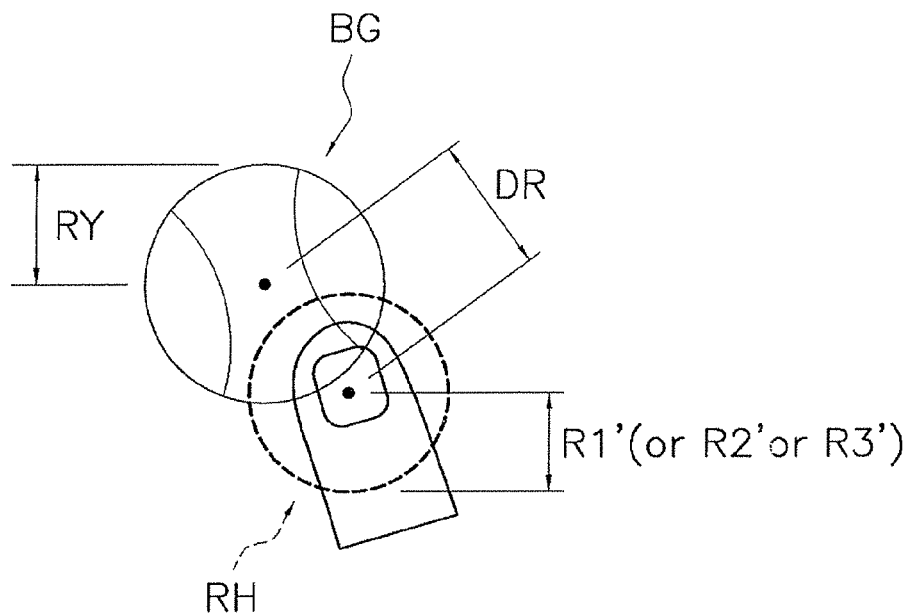
FIG. 19 is a diagram for explaining positional determination between a prospective region of the ball image and an adjusted determination region.
Figure 19:
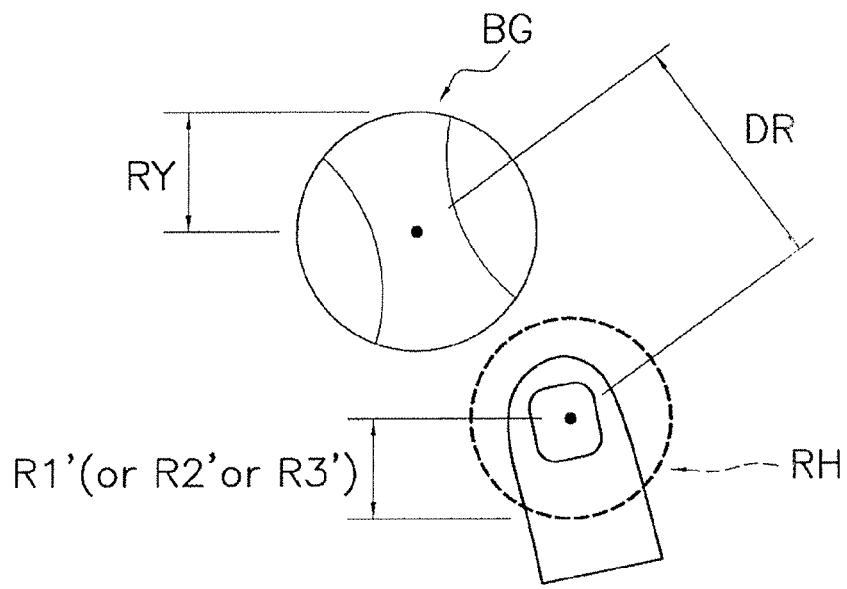

The positional relation between the prospective region BG of the ball image PG and the adjusted determination region RH is determined based on whether or not a center-to-center distance DR connecting the center of the prospective region BG of the ball image PG and the center of the adjusted determination region RH is less than sum WR of a radius RY of the prospective region BG of the ball image PG and the radius R1', R2' or R3' of the adjusted determination region RH. For example, it is determined that the prospective region BG of the ball image PG and the adjusted determination region RH are overlapped when the center-to-center distance DR is less than the sum WR (i.e., DR<WR) as illustrated in FIG. 19(a). In this case, the batter character hits back the ball. On the other hand, it is determined that the prospective region BG of the ball image PG and the adjusted determination region RH are not overlapped, for instance, when the center-to-center distance DR is greater than or equal to the aforementioned sum WR (DR≥WR) as illustrated in FIG. 19(b). In this case, the batter character does not hit back the ball. It is thus determined whether or not the batter character can hit the ball in the perspective of space (Step S50).

Figure 20:
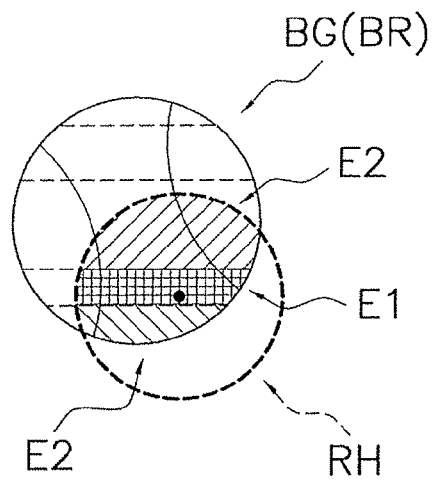
FIG. 20 is a diagram for explaining an image of informing a contact hitting position.
Figure 20:
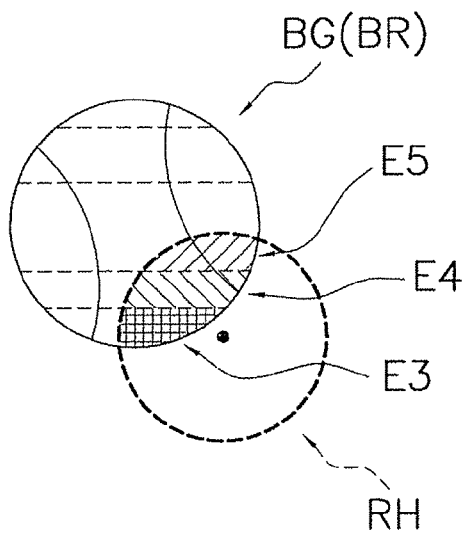

The CPU 11 herein issues a moving command for moving the ball from its current position to another position when it is determined that the prospective region BG of the ball image PG and the adjusted determination region RH are overlapped, i.e., when the batter character hits back the ball (Yes in Step S50). Accordingly, the monitor 3a displays the image for informing the position of a finger with respect to the ball (Step S51). For example, as illustrated in FIG. 20, the monitor 3a displays the prospective region BG of the ball image PG (i.e., an afterimage of the ball at the moment when the ball is hit) and an image for informing a part of the region of the ball overlapped with the adjusted determination region RH. Especially when the center of the adjusted determination region RH is positioned within the prospective region BG of the ball image PG as illustrated in FIG. 20(a), a part E1 of the segmented region on which the center of the adjusted determination region RH is positioned (hereinafter explained as "the segmented region" in the following related explanation) is highlighted. Further, two segmented regions E2 adjacent to the segmented region E1 are also highlighted at a highlighting level lower than that of the segmented region E1.

Specifically, colors, densities or the like can be herein used for highlighting. For example, the afterimage of the ball is entirely displayed with a color of translucent pale white. Further, the aforementioned segmented region E1 is displayed with a color of translucent red, whereas the segmented regions E2 on the both sides of the segmented region E1 are displayed with a color of translucent pink. Thus, only the segmented region E1 and the segmented regions E2 of the ball hit with the bat may be colored while the center part of these segmented regions may be especially outstandingly colored. It should be noted that the entire afterimage of the ball is desirably displayed under the condition that the segmented regions, explained with reference to FIG. 8, are segmented by, for instance, solid lines or dotted lines for distinguishing the respective segmented regions. The configuration allows the game player to check the batting ability of the batter character. Therefore, the game player can recognize that a good or bad batting result was obtained when a predetermined segmented region is wide. Consequently, the game player further gets interested in the video game.

On the other hand, when the center of the adjusted determination region RH is positioned outside the prospective region BG of the ball image PG as illustrated in FIG. 20 (b), some of the segmented regions are informed, which are crossed by the straight line connecting the center of the adjusted determination region RH and the center of the prospective region BG of the ball image PG. Especially, a segmented region E3 closest to the center of the adjusted determination region RH is herein highlighted. Further, highlighting levels for displaying the other segmented regions are gradually reduced in proportion to increase in a distance from the segmented region E3 to the other segmented regions. In other words, the highlighting levels for displaying the segmented regions E4 and E5 are gradually reduced from the highlighting level of the segmented region E3 in this order. Specifically, the segmented regions E3, E4 and E5 may be respectively displayed with colors of translucent red, translucent pink and translucent gray, for instance. It should be noted that the respective segmented regions are displayed with different colors in the examples of FIGS. 20 (a) and 20 (b). However, the combination of the segmented regions E1 and E2 or the combination of the segmented regions E3, E4 and E5 may be collectively displayed with the same color of red for simplification.

Thus, the game player can visually easily check the position on the ball hit by the batter character by displaying the afterimage of the ball at the moment when the ball is hit and the image for informing a part of the region of the ball overlapped with the adjusted determination region RH on the monitor 3a.

Next, when the ball is hit back, the CPU 11 executes a processing of calculating the second path of the ball (i.e., the path of the ball hit back by the batter character) (Step S52). The CPU 11 herein executes a processing of calculating the second path of the ball based on the swing pattern and the slide speed. The tendency data K (I), which is allocated to the segmented regions overlapped with the adjusted determination region RH, are herein considered in calculating the second path.

For example, the CPU 11 executes a processing of setting a moving tendency of the flying pattern of the hit-back ball based on the tendency data K (I) allocated to any one of the segmented regions overlapped with the adjusted determination region RH. For example, when the center of the adjusted determination region RH is positioned within any one of the segmented regions as illustrated in FIG. 20 (a), the CPU 11 executes a processing of setting the moving tendency of the ball based on the tendency data K (I) of the segmented regions. In contrast, when the center of the adjusted determination region RH is positioned outside the segmented regions as illustrated in FIG. 20 (b), the CPU 11 recognizes the segmented region closest to the adjusted determination region RH. The CPU 11 then executes a processing of setting the moving tendency of the ball based on the tendency data K (I) allocated to the segmented region.

Specifically, the moving tendency is set as follows.

For example, when the moving tendency indicated by the tendency data K (I) is "the grounder", the CPU 11 recognizes "1, 3, 5, 7, and 9" as numbers corresponding to "the grounder". Further, the CPU 11 recognizes "2" as "the line drive", "4" as "the home run", "6" as "the fly", and "8" as "the foul tip". The CPU 11 then executes a processing of generating random numbers from "1" to "9" based on a random number generating program. A moving tendency, corresponding to the value of the random number herein generated, is then set as the flying pattern of the hit-back ball.

For example, when the random number herein generated is any one of "1, 3, 5, 7, and 9", "the grounder" is set as the flying pattern of the hit-back ball. Further, when the random number is "2", "the line drive" is set as the flying pattern of the hit-back ball. When the random number is "4", "the home run" is set as the flying pattern of the hit-back ball. When the random number is "6", "the fly" is set as the flying pattern of the hit-back ball. When the random number is "8", "the foul tip" is set as the flying pattern of the hit-back ball. Thus, "the grounder", which is one of the moving tendencies indicated by the tendency data K (I), has the highest chances of being selected as the flying pattern of the hit-back ball. As described above, the moving tendency definitely refers to a tendency of the flying pattern of the hit-back ball. Therefore, "the grounder" is not necessarily selected as the flying pattern of the hit-back ball even if the moving tendency is "the grounder". In other words, the other flying patterns excluding "the grounder" may be selected with a small probability even when the moving tendency indicated by the tendency data K (I) is "the grounder".

When the moving tendency indicated by the tendency data K (I) is herein any one of "the line drive", "the home run", "the fly", and "the foul tip", a flying pattern is set for it similarly to the aforementioned case of "the grounder".

Next, the CPU 11 executes: a processing of setting the release angle of the ball in accordance with the flying patterns; a processing of setting the initial speed of the ball in accordance with the swing patterns; a processing of correcting the initial speed of the ball based on the slide speed; and a processing of calculating the second path of the ball based on the corrected initial speed of the ball.

For example, when the batter character hits back the ball, the flying pattern is set as described above based on the tendency data K (I) allocated to any one of the segmented regions overlapped with the adjusted determination region RH (e.g., the tendency data K (I) of any one of "the grounder", "the line drive", "the home run", "the fly", and "the foul tip"). The release angle of the hit-back ball is then set based on the flying pattern. The angle data indicating the release angle of the hit-back ball is set to be a predetermined value under the condition that the release angle is increased depending on the flying patterns in the order of "the grounder", "the line drive", "the home run", "the fly", and "the foul tip". It should be noted that the correspondence between the respective flying patterns and the release angle data is preliminarily set in the game program and is stored in the RAM 13.

When the batter character hits back the ball, the CPU 11 further sets the initial speed data Vb of the ball for increasing the initial speed depending on the swing patterns in the order of "the compact swing", "the normal swing", and "the full swing". Yet further, the CPU 11 corrects the initial speed data Vb of the ball for further increasing the initial speed set for each swing pattern in proportion to increase in the slide speed data SV. For example, the CPU 11 corrects the initial speed data Vb of the ball by executing a processing of multiplying the initial speed data corresponding to the swing pattern by the correction coefficient data HS corresponding to the slide speed data SV.

When the batter character hits back the ball, the speed of the hit-back ball is generally changed not only by the magnitude of the swing motion but also by the magnitude of the swing speed. Therefore, the hit-back ball is herein realistically duplicated by setting the initial speed data Vb of the ball in accordance with the swing patterns and by correcting the initial speed data Vb of the ball in accordance with the swing speed.

It should be noted that the correspondence between the swing patterns and the initial speed data Vb of the ball and the correspondence between the swing speed and the correction coefficient data HS are preliminarily set in the game program. For example, the correspondences are set based on correspondence tables and the correspondence tables are stored in the RAM 13.

When the release angle data of the ball and the corrected initial speed data Vb' of the ball are thus set as the initial conditions, the CPU 11 executes a processing of calculating the second path of the ball based on the initial conditions (Step S52).

The second path of the ball (i.e., the path of the ball hit back by the batter character) is set by a basic equation of the hit-back ball. The basic equation of the hit-back ball is a function of position and time. The basic equation of the hit-back ball and its variables and constants are preliminarily set in the game program. The CPU 11 executes of a processing of substituting the corrected initial speed data Vb' of the ball, the coordinate data of the release position of the ball, the angular data indicating the release angle of the ball and etc. into the basic equation. In other words, respective coefficients of a trajectory equation of the hit-back ball are determined by substituting the initial conditions into the basic equation of the hit-back ball, and the trajectory equation of the hit-back ball is accordingly set. Thus, setting of the trajectory equation of the hit-back ball is executed. The processing of deriving the trajectory equation of the hit-back ball corresponds to the processing of calculating the second path of the ball.

Next, the CPU 11 recognizes the coordinate data indicating the position of the ball moving on the second path. The position of the ball on the second path is herein calculated on a frame-by-frame basis by shifting time forward from the time on the release position of the ball on a frame-by-frame basis in the trajectory equation of the hit-back ball. The CPU 11 then recognizes the coordinate data indicating the position of the ball on the second path on a frame-by-frame basis. Accordingly, the monitor 3a displays the ball moving on the second path using the image data for the ball based on the coordinate data indicating the position of the ball on the second path (Step S53).

It should be noted that the position of a finger with respect to the ball is not informed when it is determined that the prospective region BG of the ball image PG and the adjusted determination region RH are not overlapped (No in Step S55). Specifically, the position of a finger with respect to the ball is not informed when the batter could not hit back the ball. In this case, it is determined that the batter character swung the bat without hitting the ball and the CPU 11 executes the processing of Step S45 again.

Next, the CPU 11 determines a result of a play and executes the next play. The CPU 11 then determines whether or not three outs are recorded as a play condition (Step S54). When it is determined that three outs have not been recorded yet as a play condition (No in Step S54), the CPU 11 executes the processing of Step S43 again. When it is determined that three outs have been recorded as a play condition (Yes in Step S54), on the other hand, the CPU 11 determines whether or not the baseball match is over (Step S55). When it is determined that the baseball match has not been over yet (No in Step S55), the CPU 11 executes the processing of Step S13 again. When it is determined that the baseball match has been over (Yes in Step S55), on the other hand, the CPU 11 executes a processing of saving a game result (Step S56).

It is herein determined whether or not a baseball match is over only when batting of the team taking the field first is finished for easy explanation. However, it is desirable to execute the determination when batting of the team batting first is finished as well.

Other Exemplary Embodiments (a) In the aforementioned exemplary embodiment, a portable game console has been exemplified as a computer to which the game program can be applied. However, the computer is not limited to the aforementioned exemplary embodiment. The game program can be similarly applied to a game device provided with a separate monitor, a game device integrally formed with a monitor, and a personal computer or a work station functioning as a game device through execution of the game program.

(b) The present invention includes a program for executing a video game as described above and a computer-readable recording medium storing the program. Excluding the cartridge, a variety of media such as a flexible disk, a semiconductor memory, a CD-ROM, a DVD, an MO and a ROM cassette may be used as the computer-readable recording medium.

(c) The present exemplary embodiment has been explained mainly using the baseball video game. However, the present invention can be applied to games configured to hit a stationary ball away (e.g., a golf game and a penalty kick of a football game).

Industrial Applicability

The present invention can be used in a game configured to give a command in response to contact of an instruction section onto an image display unit of a touch input type.

What is claimed is:

1. A non-transitory computer readable medium storing a game program for a baseball game which a computer executes in response to contact of an instruction section of a contact input type image display unit, the game program instructing the computer to perform the following operations:

detect a first contact made on the instruction section, and convert the first contact into a simulated representation of a ball moving in an environment by calculating a first path of a simulated ball moving in a game space, recognizing a first coordinate data indicating a position of the simulated ball moving on the first path, and displaying the simulated ball moving on the first path on the image display unit based on the first coordinate data;

provide a simulated representation of a bat in the environment by displaying a simulated bat on the image display unit and moving the simulated bat to simulate motion of the bat in the environment with respect to the ball in response to the computer detecting a second contact on the instruction section by recognizing second coordinate data indicating a position of the instruction section contacted by the second contact if the computer determines that the instruction section is contacted by the second contact, calculating a slide distance of the instruction section based on the position indicated by the second coordinate data if the computer determines that the instruction section is slid during the second contact, and setting a determination region based on the second coordinate data in accordance with the slide distance in order to include the position of the instruction section within the determination region, the determination region being set smaller as the slide distance is larger to simulate a particular type of motion of the bat in the environment, and the simulated bat being arranged to potentially make contact with the simulated ball in the determination region;

determine a positional relation between the simulated ball and the determination region to determine whether the positional relation is a simulated representation of the bat contacting the ball in the environment, and calculate a second path of movement of the simulated ball if the simulated ball and the determination region are overlapped to indicate simulated movement of the ball upon contact by the bat in the environment;

recognize third coordinate data indicating a position of the simulated ball moving on the second path; and display the simulated ball moving on the second path on the image display unit based on the third coordinate data.

2. The non-transitory computer readable medium according to claim 1, the game program further comprising;

code for setting an action pattern of the character with respect to the object in accordance with the slide distance, wherein the code for calculating the second path of the object includes code for setting an initial speed of the object corresponding to the action pattern and code for calculating the second path of the object based on the initial speed of the object.

3. The non-transitory computer readable medium according to claim 2, wherein the code for calculating the second path of the object includes code for setting the initial speed of the object to be faster as an action expressed by the action pattern is larger.

4. The non-transitory computer readable medium according to claim 2, the game program further comprising code for calculating a slide speed of the instruction section if the instruction section is slid in contact with the image display unit, wherein the code for calculating the second path of the object based on the action pattern and the slide speed.

5. The non-transitory computer readable medium according to claim 4, wherein the code for calculating the second path of the object includes code for setting the initial speed of the object to a corrected initial speed corresponding to the action pattern, code for correcting the initial speed of the object based on the slide speed and code for calculating the second path of the object based on the corrected initial speed.

6. The non-transitory computer readable medium according to claim 1, the game program further comprising;

code for adjusting the determination region in accordance with the slide distance to be an adjusted determination region, wherein the code for determining positional relation includes code for determining a positional relation between the object and the adjusted determination region.

7. The non-transitory computer readable medium according to claim 6, wherein the code for adjusting the determination region includes code for rendering the determination region have a fixed size when the slide distance is greater than a predetermined value.

8. The non-transitory computer readable medium according to claim 1, the game program further comprising code for recognizing time data indicating a point of time when a predetermined period of time elapses after the instruction section is contacted onto the image display unit, wherein the code for determining the positional relation between the object and the determination region includes code for determining a positional relation between the object and the determination region at the point of time.

9. A game device for a baseball game in response to contact of an instruction section of a contact input type image display unit, the game device comprising:

a contact detection section configured to detect the contact of the instruction section on the image display unit;

a first contact detecting section configured to cause a control unit to detect a first contact made on the instruction section, and convert the first contact into a simulated representation of a ball moving in an environment by calculating a first path of a simulated ball moving in a game space;

a first object position recognizing section configured to cause the control unit to recognize first coordinate data indicating a position of the simulated ball moving on the first path;

a first object displaying section configured to display the simulated ball moving on the first path on the image display unit based on the first coordinate data;

a character displaying section configured to provide a simulated representation of a bat in the environment by displaying a simulated bat on the image display unit and moving the simulated bat to simulate motion of the bat in the environment with respect to the ball in response to the contact detection section detecting a second contact on the instruction section of the image display unit by recognizing second coordinate data indicating a position of the instruction section contacted by the second contact when the contact detection section detects that the instruction section is contacted by the second contact;

a slide distance calculating section configured to cause the control unit to calculate a slide distance of the instruction section based on the position indicated by the second coordinate data if the contact detection section detects that the instruction section is slid during the second contact with the image display unit;

a determination region setting section configured to cause the control unit to set a determination region based on the second coordinate data in accordance with the slide distance in order to include the position of the instruction section within the determination region, the determination region being set to be smaller as the slide distance is larger to simulate a particular type of motion of the bat in the environment, and the simulated bat being arranged to potentially make contact with the simulated ball in the determination region;

a positional relation determining section configured to cause the control unit to determine a positional relation between the simulated ball and the determination region to determine whether the positional relation is a simulated representation of the bat contacting the ball in the environment;

a second path calculating section configured to cause the control unit to calculate a second path of movement of the simulated ball if the simulated ball and the determination region are overlapped to indicate simulated movement of the ball upon contact by the bat in the environment;

a second object position recognizing section configured to cause the control unit to recognize third coordinate data indicating a position of the simulated ball moving on the second path; and a second object displaying section configured to display the simulated ball moving on the second path on the image display unit based on the third coordinate data.

10. A game control method for implementing a baseball game which the computer executes a game in response to contact of an instruction section of a contact input type image display unit, the game control method comprising detecting, by the computer, the contact of the instruction section onto the contact input type image display unit;

detect a first contact made on the instruction section, and convert the first contact into a simulated representation of a ball moving in an environment by calculating a first path of a simulated ball moving in a game space;

recognizing first coordinate data indicating a position of the simulated ball moving on the first path;

displaying the simulated ball moving on the first path on the image display unit based on the first coordinate data;

providing a simulated representation of a bat in the environment by displaying a simulated bat on the image display unit and moving the simulated bat to simulate motion of the bat in the environment with respect to the ball in response to the computer detecting a second contact on the instruction section of the image display unit by recognizing second coordinate data indicating a position of the instruction section contacted by the second contact if the computer detects that the instruction section is contacted by the second contact;

calculating a slide distance of the instruction section based on the position indicated by the second coordinate data when the computer detects that the instruction section is slid during the second contact with the image display unit;

setting a determination region based on the second coordinate data in accordance with the slide distance in order to include the position of the instruction section within the determination region, the determination being set to be smaller as the slide distance is larger to simulate a particular type of motion of the bat in the environment, and the simulated bat being arranged to make contact with the simulated ball in the determination region;

determining a positional relation between the simulated ball and the determination region to determine whether the positional relation is a simulated representation of the bat contacting the ball in the environment;

calculating a second path of movement of the simulated ball if the simulated ball and the determination region are overlapped to indicate simulated movement of the ball upon contact by the bat in the environment;

recognizing third coordinate data indicating a position of the simulated ball moving on the second path; and displaying the simulated ball moving on the second path on the image display unit based on the third coordinate data.

* * * * *